(12) United States Patent
Ellis

(10) Patent No.: US 8,869,260 B2
(45) Date of Patent: *Oct. 21, 2014

(54) COMPUTER OR MICROCHIP WITH A MASTER CONTROLLER CONNECTED BY A SECURE CONTROL BUS TO NETWORKED MICROPROCESSORS OR CORES

(71) Applicant: Frampton E. Ellis, Jasper, FL (US)

(72) Inventor: Frampton E. Ellis, Jasper, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/768,582

(22) Filed: Feb. 15, 2013

(65) Prior Publication Data
US 2013/0160106 A1    Jun. 20, 2013

Related U.S. Application Data

(63) Continuation of application No. 13/555,750, filed on Jul. 23, 2012, now Pat. No. 8,474,033, which is a
(Continued)

(51) Int. Cl.
| | | |
|---|---|---|
| *G06F 15/173* | (2006.01) | |
| *G06F 13/40* | (2006.01) | |
| *G06F 21/50* | (2013.01) | |
| *G06F 21/85* | (2013.01) | |
| *H04L 29/06* | (2006.01) | |
| *G06F 17/00* | (2006.01) | |

(52) U.S. Cl.
CPC ............ *H04L 63/02* (2013.01); *G06F 21/50* (2013.01); *G06F 21/85* (2013.01); *H04L 63/0227* (2013.01)
USPC .............. 726/11; 726/22; 726/30; 713/153; 713/154; 713/194

(58) Field of Classification Search
USPC ............ 726/11, 22, 30; 713/153, 154, 194
See application file for complete search history.

(56) References Cited

U.S. PATENT DOCUMENTS 4,882,752 A * 11/1989 Lindman et al. .............. 713/166
5,550,984 A     8/1996 Geib
(Continued)

FOREIGN PATENT DOCUMENTS

| EP | 1164766 A2 | 12/2001 |
| WO | 2011103299 | 8/2011 |

OTHER PUBLICATIONS

Complete file history for U.S. Appl. No. 13/014,201.
(Continued)

*Primary Examiner* — Michael Simitoski
(74) *Attorney, Agent, or Firm* — Mendelsohn, Drucker & Dunleavy, P.C.

(57) ABSTRACT

A computer or microchip securely controlled through a private network including a connection to a network of computers including the Internet; a separate connection to at least a private network of computers located in a hardware protected area of said computer or microchip, a first microprocessor, core or processing unit configured to connect to the connection to the network of computers including the Internet; a master controlling device for the computer or microchip located in the hardware protected area; and a secure control bus configured to connect at least said master controlling device with said microprocessor, core or processing unit, and isolated from input from the network and components other than said master controlling device. The master controlling device securely controls an operation executed by the microprocessor, core or processing unit, with secure control being provided through the private network to the private network connection through the secure control bus.

54 Claims, 16 Drawing Sheets

Related U.S. Application Data continuation of application No. 13/328,697, filed on Dec. 16, 2011, now Pat. No. 8,255,986, which is a continuation of application No. PCT/US2011/025257, filed on Feb. 17, 2011, which is a continuation-in-part of application No. 13/014,201, filed on Jan. 26, 2011, now abandoned, and a continuation-in-part of application No. 13/016,527, filed on Jan. 28, 2011, now Pat. No. 8,171,537.

(60) Provisional application No. 61/457,184, filed on Jan. 24, 2011, provisional application No. 61/344,018, filed on May 7, 2010, provisional application No. 61/282,861, filed on Apr. 12, 2010, provisional application No. 61/282,503, filed on Feb. 22, 2010, provisional application No. 61/457,265, filed on Feb. 15, 2011, provisional application No. 61/282,478, filed on Feb. 17, 2010, provisional application No. 61/282,378, filed on Jan. 29, 2010, provisional application No. 61/282,337, filed on Jan. 26, 2010.

(56) References Cited

U.S. PATENT DOCUMENTS

| | | | | |
|---|---|---|---|---|
| 5,802,320 | A | 9/1998 | Baehr et al. | |
| 5,896,499 | A | 4/1999 | McKelvey | |
| 6,115,819 | A * | 9/2000 | Anderson | 726/20 |
| 6,167,428 | A | 12/2000 | Ellis | |
| 6,202,153 | B1 | 3/2001 | Diamant et al. | |
| 6,272,533 | B1 * | 8/2001 | Browne | 709/213 |
| 6,578,140 | B1 * | 6/2003 | Policard | 713/1 |
| 6,725,250 | B1 | 4/2004 | Ellis | |
| 6,732,141 | B2 | 5/2004 | Ellis | |
| 6,772,347 | B1 * | 8/2004 | Xie et al. | 726/11 |
| 6,865,672 | B1 * | 3/2005 | Carmeli | 713/155 |
| 7,024,449 | B1 | 4/2006 | Ellis | |
| 7,035,906 | B1 | 4/2006 | Ellis | |
| 7,047,275 | B1 | 5/2006 | Ellis | |
| 7,467,406 | B2 | 12/2008 | Cox et al. | |
| 7,484,247 | B2 * | 1/2009 | Rozman et al. | 726/34 |
| 7,506,020 | B2 | 3/2009 | Ellis | |
| 7,562,211 | B2 | 7/2009 | Paya et al. | |
| 7,606,854 | B2 | 10/2009 | Ellis, III | |
| 7,634,529 | B2 | 12/2009 | Ellis | |
| 7,761,605 | B1 * | 7/2010 | Rothwell et al. | 709/250 |
| 7,805,756 | B2 | 9/2010 | Ellis | |
| 7,814,233 | B2 | 10/2010 | Ellis | |
| 7,840,997 | B2 | 11/2010 | Shevchenko | |
| 7,908,650 | B2 | 3/2011 | Ellis | |
| 7,926,097 | B2 | 4/2011 | Ellis | |
| 7,984,301 | B2 | 7/2011 | Kaabouch et al. | |
| 8,010,789 | B2 | 8/2011 | Witchey | |
| 8,171,537 | B2 | 5/2012 | Ellis | |
| 8,255,986 | B2 | 8/2012 | Ellis | |
| 2001/0054159 | A1 | 12/2001 | Hishino | |
| 2004/0073603 | A1 | 4/2004 | Ellis | |
| 2004/0098621 | A1 | 5/2004 | Raymond | |
| 2004/0158744 | A1 | 8/2004 | Deng et al. | |
| 2004/0162992 | A1 | 8/2004 | Sami et al. | |
| 2004/0215931 | A1 | 10/2004 | Ellis | |
| 2004/0236874 | A1 * | 11/2004 | Largman et al. | 710/8 |
| 2005/0138169 | A1 | 6/2005 | Bahr | |
| 2006/0031940 | A1 * | 2/2006 | Rozman et al. | 726/27 |
| 2006/0075001 | A1 | 4/2006 | Canning | |
| 2006/0095497 | A1 | 5/2006 | Ellis | |
| 2006/0177226 | A1 | 8/2006 | Ellis | |
| 2006/0190565 | A1 | 8/2006 | Ellis | |
| 2007/0162974 | A1 | 7/2007 | Speidel | |
| 2007/0261112 | A1 * | 11/2007 | Todd et al. | 726/11 |
| 2007/0300305 | A1 | 12/2007 | Gonsalves et al. | |
| 2008/0134290 | A1 | 6/2008 | Olsson | |
| 2009/0031412 | A1 | 1/2009 | Ellis | |
| 2009/0200661 | A1 | 8/2009 | Ellis | |
| 2009/0254986 | A1 | 10/2009 | Harris et al. | |
| 2009/0282092 | A1 | 11/2009 | Ellis | |
| 2010/0011083 | A1 | 1/2010 | Ellis | |
| 2011/0004930 | A1 | 1/2011 | Ellis | |
| 2011/0004931 | A1 | 1/2011 | Ellis | |
| 2011/0225645 | A1 | 9/2011 | Ellis | |
| 2012/0096537 | A1 | 4/2012 | Ellis | |

OTHER PUBLICATIONS

Complete file history for U.S. Appl. No. 13/016,527.
Complete file history for U.S. Appl. No. 13/328,697.
Complete file history for U.S. Appl. No. 13/398,403.
Complete file history for U.S. Appl. No. 13/555,750.
Famatech, Redmin v3.0, User Manual, 2007.
Complete file history for U.S. Appl. No. 13/815,814.
Complete file history for U.S. Appl. No. 13/761,126.
Notice of Allowance; Mailed Apr. 14, 2014 for the corresponding U.S. Appl. No. 13/761,126.

* cited by examiner

COMPUTER OR MICROCHIP WITH A
MASTER CONTROLLER CONNECTED BY A
SECURE CONTROL BUS TO NETWORKED
MICROPROCESSORS OR CORES

This application is a continuation of U.S. patent application Ser. No. 13/555,750, filed on Jul. 23, 2012 which is a continuation of U.S. patent application Ser. No. 13/328,697, filed on Dec. 16, 2011, currently pending, which, in turn, is a nonprovisional of U.S. provisional app. No. 61/457,265, filed Feb. 15, 2011, and a continuation of PCT/US2011/025257, filed Feb. 17, 2011, which, in turn, is a nonprovisional of U.S. provisional app. Nos. 61/457,184, filed Jan. 24, 2011; 61/344,018; filed May 7, 2010, 61/282,861, filed Apr. 12, 2010; 61/282,503, filed Feb. 22, 2010 and 61/282,478, filed Feb. 17, 2010. PCT/US2011/025257 is also a continuation-in-part of U.S. application Ser. No. 13/016,527, filed Jan. 28, 2011, which, in turn, is a nonprovisional of U.S. provisional app. Nos. 61/457,184, filed Jan. 24, 2011; 61/344,018; filed May 7, 2010, 61/282,861, filed Apr. 12, 2010; 61/282,503, filed Feb. 22, 2010; 61/282,478, filed Feb. 17, 2010; and 61/282,378, filed Jan. 29, 2010. PCT/US2011/025257 is also a continuation-in-part of U.S. application Ser. No. 13/014,201, filed Jan. 26, 2011, which, in turn, is a nonprovisional of U.S. provisional app. Nos. 61/457,184, filed Jan. 24, 2011; 61/344,018; filed May 7, 2010, 61/282,861, filed Apr. 12, 2010; 61/282,503, filed Feb. 22, 2010; 61/282,478, filed Feb. 17, 2010; 61/282,378, filed Jan. 29, 2010; and 61/282,337, filed Jan. 26, 2010. The content of each and every one of the foregoing patent applications is hereby incorporated by reference in its entirety.

BACKGROUND OF THE INVENTION

This invention relates to any computer of any form, such as a personal computer and/or microchip, that has an inner hardware-based access barrier or firewall that establishes a private unit that is disconnected from a public unit, the public unit being configured for a connection to a insecure public network of computers including the Internet. In addition, the computer's private unit is configured for a separate connection to at least one secure non-Internet-connected private network for administration, management, and/or control of the computer and/or microchip, locally or remotely, by either a personal user or a business or corporate entity.

More particularly, this invention relates to a computer and/or microchip with an inner hardware-based access barrier or firewall separating the private unit that is not connected to the Internet from a public unit connected to the Internet, the private and public units being connected only by a hardware-based access barrier or firewall in the form of a secure, out-only bus or equivalent wireless connection. Even more particularly, this invention relates to the private and public units also being connected by an in-only bus (or equivalent wireless connection) that includes a hardware input on/off switch or equivalent signal interruption mechanism, including an equivalent circuit on a microchip or nanochip (or equivalent wireless connection). Still more particularly, this invention relates to the private and public units being connected by an output on/off switch or microcircuit or nanocircuit equivalent on the secure, out-only bus (or equivalent wireless connection).

In addition, this invention relates to a computer and/or microchip that is connected to a another computer and/or microchip, the connection between computers being made with the same hardware-based access barriers or firewalls including potentially any of the buses and on/off switches described in the preceding paragraph.

Finally, this invention relates to a computer and/or microchip with hardware-based access barriers or firewalls used successively between an outer private unit, an intermediate more private unit, an inner most private unit, and the public unit (or units), with each private unit potentially being configured for a connection to a separate secure private network. Also, Faraday Cage protection from external electromagnetic pulses for part or all of the computer and/or microchip can be provided.

By way of background, connecting computers to the Internet has immense and well know benefits today, but also has created overwhelming security problems that were not imagined when the basic architecture of modern electronic computers was developed in 1945, which was about twenty years before networks came into use. Even then, those first networks involved a very limited number of connected computers, had low transmission speeds between them, and the network users were generally known to each other, since most networks were relatively small and local.

In contrast, the number of computers connected to the Internet today is greater by a factor of many millions, broadband connection speeds are faster by a similar magnitude, the network connections stretch worldwide and connect to hundreds of thousands of bad actors whose identity is not easily or quickly known, if ever. Indeed, the Internet of today allows the most capable criminal hackers direct access to any computer connected to the Internet. This inescapable reality of the Internet has created a huge and growing threat to military and economic security worldwide. At the same time, connection to the Internet has become the communication foundation upon which both the global economy and individual users depend every day.

In summary, then, computer connection to the Internet is mandatory in today's world, so disconnection is not a feasible option, given the existing global dependence on the Internet. But those unavoidable connections have created a seemingly inherent and therefore unsolvable security problem so serious that it literally threatens the world. So Internet connection today is both unavoidable and unavoidably unsafe.

Past efforts to provide Internet security have been based primarily on conventional firewalls that are positioned externally, physically and/or functionally, between the computer and an external network like the Internet. Such conventional firewalls provide a screening or filtering function that attempts to identify and block incoming network malware. But because of their functionally external position, conventional firewalls must allow entry to a significant amount of incoming traffic, so either they perform their screening function perfectly, which is an impossibility, or at least some malware unavoidably gets into the computer and just a single instance of malware can cause a crash or worse. Once the malware is in, the von Neumann architecture of current computers provides only software protection, which is inherently vulnerable to malware attack, so existing computers are essentially indefensible from successful attack from the Internet, which has provided an easy, inexpensive, anonymous, and effective means for the worst of all hackers worldwide to access any computer connected to it.

SUMMARY OF THE INVENTION

Therefore, computers cannot be successfully defended without inner hardware or firmware-based access barriers or firewalls that, because of their internal position, can be designed much more simply to function as a access barrier or blockers rather than as general filters. An Internet filter has to screen any network traffic originating from anywhere in the entire Internet, which is without measure in practical terms and is constantly, rapidly changing, an incredibly difficult if not impossible screening task. In contrast, an access barrier or blocker to an inner protected area of a computer can strictly limit access to only an exception basis. So, in simple terms, a conventional firewall generally grants access to all Internet traffic unless it can be identified as being on the most current huge list of ever changing malware; in contrast, an inner access barrier or blocker can simply deny access to all network traffic, with the only exception being a carefully selected and very short and conditioned list of approved and authenticated sources or types of traffic to which access is not denied.

Such a massively simpler and achievable access blocking function allowing for a much simpler and efficient mechanism for providing reliable security. Whereas a conventional but imperfect firewall requires extremely complicated hardware with millions of switches and/or firmware and/or software with millions of bits of code, the hardware-based access barriers described in this application require as little as a single simple one-way bus and/or another simple one-way bus with just a single switch and/or both simple buses, each with just a single switch. This extraordinarily tiny amount of hardware is at the absolute theoretical limit and cannot be less.

With this new and unique access denial approach, a computer and/or microchip can be simply and effectively defended from Internet malware attack with one or more hardware-based private, protected units (or zones or compartments) inside the computer. Any or all of these private units can be administered, managed, and/or controlled by a personal or corporate computer user through the use of one or more separate and secure non-Internet private networks. By thus avoiding any connection whatsoever to the insecure public Internet, connection of the computer's private unit to the secure private network allows for all the well known speed, efficiency and cost effectiveness of network connection while still completely avoiding the incalculable risk of Internet connection.

This application hereby expressly incorporates by reference in its entirety U.S. patent application Ser. No. 10/684,657 filed Oct. 15, 2003 and published as Pub. No. US 2005/0180095 A1 on Aug. 18, 2005 and U.S. patent application Ser. No. 12/292,769 filed Nov. 25, 2008 and published as Pub. No. US 2009/0200661 A1 on Aug. 13, 2009.

Also, this application hereby expressly incorporates by reference in its entirety U.S. patent application Ser. No. 10/802,049 filed Mar. 17, 2004 and published as Pub. No. US 2004/0215931 A1 on Oct. 28, 2004; U.S. patent application Ser. No. 12/292,553 filed Nov. 20, 2008 and published as Pub. No. US 2009/0168329 A1 on Jul. 2, 2009; and U.S. patent application Ser. No. 12/292,769 filed Nov. 25, 2008 and published as Pub. No. US 2009/0200661 A1 on Aug. 13, 2009.

Finally, this application hereby expressly incorporates by reference in its entirety U.S. Pat. No. 6,167,428 issued 26 Dec. 2000, U.S. Pat. No. 6,725,250 issued 20 Apr. 2004, U.S. Pat. No. 6,732,141 issued 4 May 2004, U.S. Pat. No. 7,024,449 issued 4 Apr. 2006, U.S. Pat. No. 7,035,906 issued 25 Apr. 2006, U.S. Pat. No. 7,047,275 issued 16 May 2006, U.S. Pat. No. 7,506,020 issued 17 Mar. 2009, U.S. Pat. No. 7,606,854 issued 20 Oct. 2009, U.S. Pat. No. 7,634,529 issued 15 Dec. 2009, U.S. Pat. No. 7,805,756 issued 28 Sep. 2010, and U.S. Pat. No. 7,814,233 issued 12 Oct. 2010.

Definitions and reference numerals are the same in this application as in the above incorporated '657, '769, '049 and '553 U.S. Applications, as well as in the above incorporated '428, '250, '141, '449, '906, '275, '020, '854, '529, '756, and '233 U.S. Patents.

BRIEF DESCRIPTION OF THE DRAWINGS

FIG. 1 also shows an example embodiment of the Private Unit 53 having at least one connection to at least one private and secure non-Internet-connected network 52 for personal or local administration of a computer such as the personal computer 1 and/or microchip 90 (and/or 501) and/or silicon wafer 1500 (or portion 1501, 1502, and/or 1503), or graphene equivalent. The number and placement of the non-Internet-connected networks 52 is optional.

DETAILED DESCRIPTION OF THE EMBODIMENTS

Figure 1:
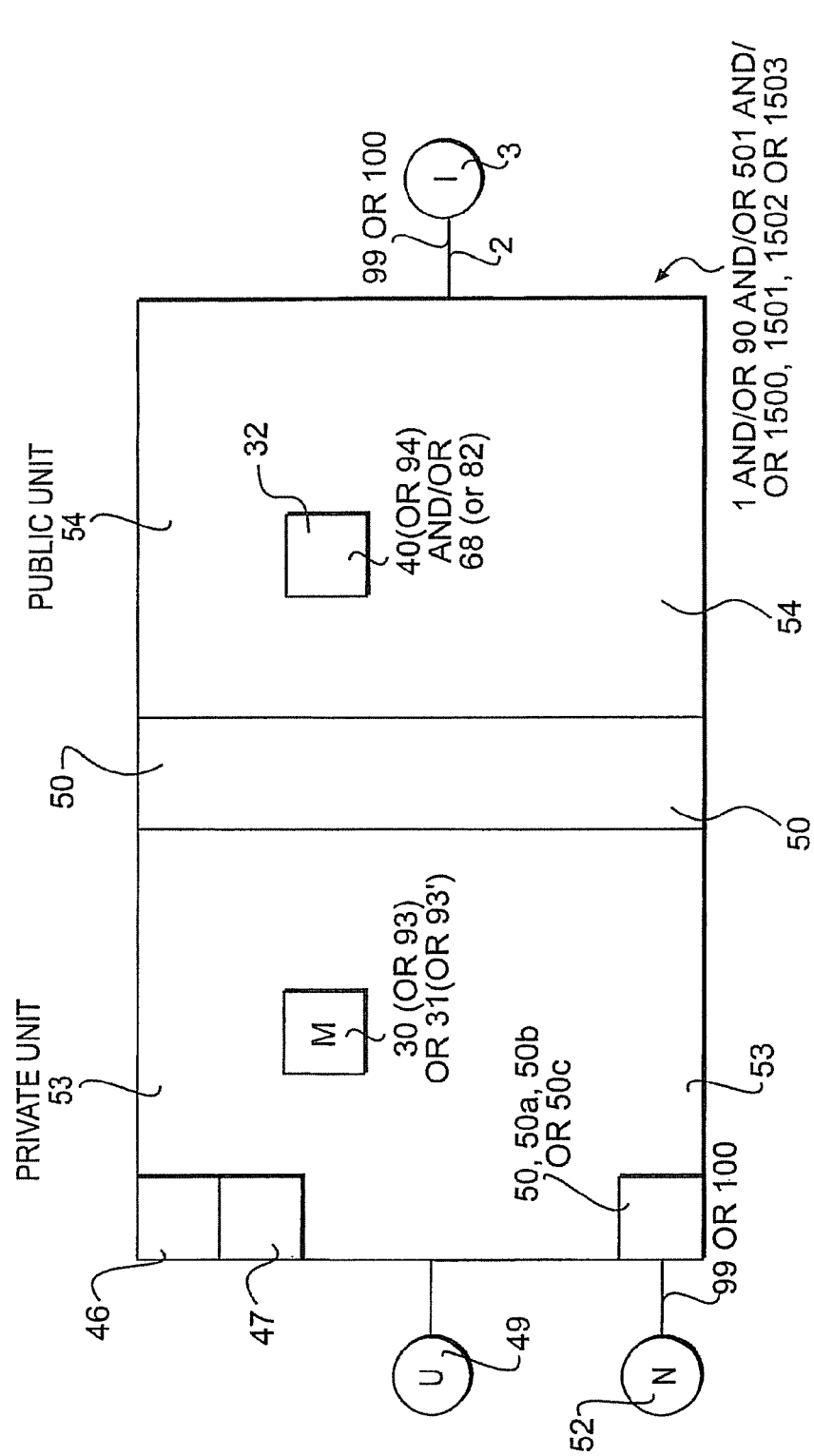
FIG. 1 shows any computer of any type or size or design, such as a personal computer 1 and/or microchip 90 (and/or 501) or nanochip with an inner hardware-based access barrier or firewall 50 establishing a Private Unit (or zone or compartment) 53 of the computer or microchip that is disconnected from a Public Unit (or zone or compartment) 54 that is connected to the insecure public Internet 3 (and/or another, intermediate network 2 that is connected to the Internet 3).

FIGS. 1-4, 6, 8-14 all show useful architectural example embodiments of any computer or microchip, including a personal computer 1 and/or microchip 90 (and/or 501) or silicon wafer (or graphene equivalent) 1500 (wafer or wafer portion 1501, 1502, and/or 1503, as described in FIGS. 19-26 and associated text of the '553 Application, which are incorporated by reference herein); tablets, smartphones, servers (including blades) and cloud or supercomputer arrays are other well known examples of computers. The computer shown has an inner hardware-based access barrier or firewall 50 establishing a secure Private Unit (or zone or compartment) 53 that is directly controlled by a user 49 (local in this example) and disconnected by hardware from a Public Unit (or zone or compartment) 54 that is connected to the open to the public and insecure Internet 3 and/or another, intermediate network 2; the connection of the computer 1 (and/or 90 and/or 501 and/or 1500 or 1501, 1502, or 1503) to the network 2 and/or Internet 3 can be wired 99 or wireless 100.

Hardware-based access barrier or firewall 50 (or 50a, 50b, or 50c) as used in this application refers to an access barrier that includes one or more access barrier or firewall-specific hardware and/or firmware components. This hardware and/or firmware configuration is in contrast to, for example, a computer firewall common in the art that includes only software and general purpose hardware, such as an example limited to firewall-specific software running on the single general purpose microprocessor or CPU of a computer.

The Internet-disconnected Private Unit 53 includes a master controlling device 30 for the computer PC1 (and/or a master controller unit 93 for the microchip 90 and/or 501) that can include a microprocessor or processing unit and thereby take the form of a general purpose microprocessor or CPU, for one useful example, or alternatively only control the computer as a master controller 31 or master controller unit 93'. The user 49 controls the master controlling device 30 (or 31 or 93 or 93') located in the Private Unit 53 and controls both the Private Unit 53 at all times and any part or all of the Public Unit 54 selectively, but can peremptorily control any and all parts of the Public Unit 54 at the discretion of the user 49 through active intervention or selection from a range of settings, or based on standard control settings by default, using for example a secure control bus 48 (to be discussed later). The Public Unit 54 typically can include one or more cores or general purpose microprocessors 40 or 94 and/or graphics-based microprocessors 68 or 82 that are designed for more general operations and not limited to graphics-related operations, including very large numbers of either or both types of microprocessors, and potentially including one or more secondary controllers 32, as well as any number of specialized or single-function microprocessors.

The inner hardware-based access barrier or firewall has the capability of denying access to said protected portion of the computer 1 or microchip 90 by an insecure public network including the Internet, while permitting access by any other computer in the insecure public network including the Internet to said one or more of the processing units included in the unprotected portion of the computer 1 or microchip 90 for an operation with said any other computer in the insecure public network including the Internet when the computer is connected to the insecure public network including the Internet. The operation can be any computer operation whatsoever involving some interaction between two computers including simply sending and/or receiving data and also including, but not limited to, specific examples such as searching, browsing, downloading, streaming, parallel processing, emailing, messaging, file transferring or sharing, telephoning or conferencing, and/or video conferencing.

More particularly, FIG. 1 shows a useful example of an optional (one or more) closed and secure private non-Internet-connected network 52 for personal or local administration and/or management and/or control of the Private Unit 53. Wired 99 connection offers superior security generally for the closed and secure private network 52, but wireless 100 connection is a option, especially if used with a sufficiently high level of encryption and/or other security measures, including low power radio signals of high frequency and short range and/or directional. Access from the closed and private non-Internet-connected network 52 can be limited to only a part of the Private Unit 53 or to multiple parts or to all of the Private Unit 53.

The closed and secure private non-Internet-connected network 52 (not connected to the open and insecure public Internet 3 either directly or indirectly, such as through another, intermediate network like an Intranet 2) allows specifically for use as a highly secure and closed private network for providing administrative or management or control functions like testing, maintenance, trouble-shooting, synchronizing files, modifying security, or operating or application system updates to the Private Units 53 of any computers (PC1 or microchip 90 or 501) with one or more Public Units 54 that are connected to an insecure local network 2, such as a business or home network, that is connected to the public Internet 3.

A particularly useful business example would be administering large numbers of local employee personal computers or network servers, and also including large arrays (especially blades) for cloud applications or supercomputer arrays with a vast multitude of microprocessors or local clusters; in the latter examples, it is possible for a centralized operator to use the secure private network 52 to control, securely and directly, the master controlling devices 30 or 31 or master controller unit 93 or 93' and associated memory or other devices in the Private Units 53 of a multitude of servers, blades, or large arrays or clusters of computers that are connected to the Internet 3. A personal use example would be to use a closed and secure private network 52 to connect the private unit 53 of a personal user's smartphone to the private unit 53 of the user's computer laptop in order to update and/or synchronize data or code between the two private units 53. To maximize security, some or all network 52 traffic can be encrypted and/or authenticated, especially if wireless 100, including with a very high level of encryption.

In addition, in another useful example, a computer (PC1 and/or 90 and/or 501) can be configured so that the closed and secure private non-Internet-connected network 52 can have the capability to allow for direct operational control of the Private Unit 53, and thus the entire computer, from any location (including a remote one), which can be useful for example for businesses operating an array of servers like blades to host cloud operations or supercomputers with large numbers of microprocessors or cores.

One or more access barriers or firewalls 50a, 50b, or 50c can be located between the secure private non-Internet-connected network 52 and the Private Unit 53 provides a useful example of increased security control.

In yet another useful example, a personal user 49 can dock his smartphone (PC1 and/or 90 and/or 501 and/or 1500, 1501, 1502, or 1503) linking through wire or wirelessly to his laptop or desktop computer (PC1 and/or 90 and/or 501 and/or 1500, 1501, 1502, or 1503) in a network 52 connection to synchronize the Private Units 53 of those two (or more) personal computers or perform other shared operations between the Private Units 53. In addition, the Public Units 54 of the user's multiple personal computers can be synchronized simultaneously during the same tethering process, or perform other shared operations between the Public Units 54. Other shared operations can be performed by the two or more linked computers of the user 49 utilizing, for example, two or three or more Private Units 53, each unit with one or more private non-Internet connected networks 52, while two or more Public Units 54 can perform shared operations using one or more other networks 2, including the open and insecure Internet 3, as shown later in FIG. 6.

Also shown in FIG. 1 for personal computer PC1 embodiments is an optional removable memory 47 located in the Private Unit 53; the removable memory 47 can be of any form or type or number using any form of one or more direct connections to the Private Unit 53; a thumbdrive or SD card are typical examples, connected to USB, Firewire, or other ports or card slots. FIG. 1 shows as well an optional one or more removable keys 46, of which an access key, an ID authentication key, or an encryption and/or decryption key are examples, also connected to the Private Unit 53 using any form of connection, including the above examples. For microchip 90 (and/or 501) embodiments, wireless connection is a feasible option to enable one or more removable memories 47 or one or more removable keys 46 (or combination of both), particularly for ID authentication and/or access control. In addition, all or part of the Private Unit 53 of a computer PC1 and/or microchip 90 and/or 501 (or wafer 1500, 1501, 1502, or 1501 can be removable from the remaining portion of the same computer PC1 and/or microchip 90 and/or 501, including the Public Unit 54; the access control barrier or firewall 50 (or 50a and/or 50b and/or 50c) can be removable with the Private Unit 53 or remain with Public Unit 54.

Figure 2:
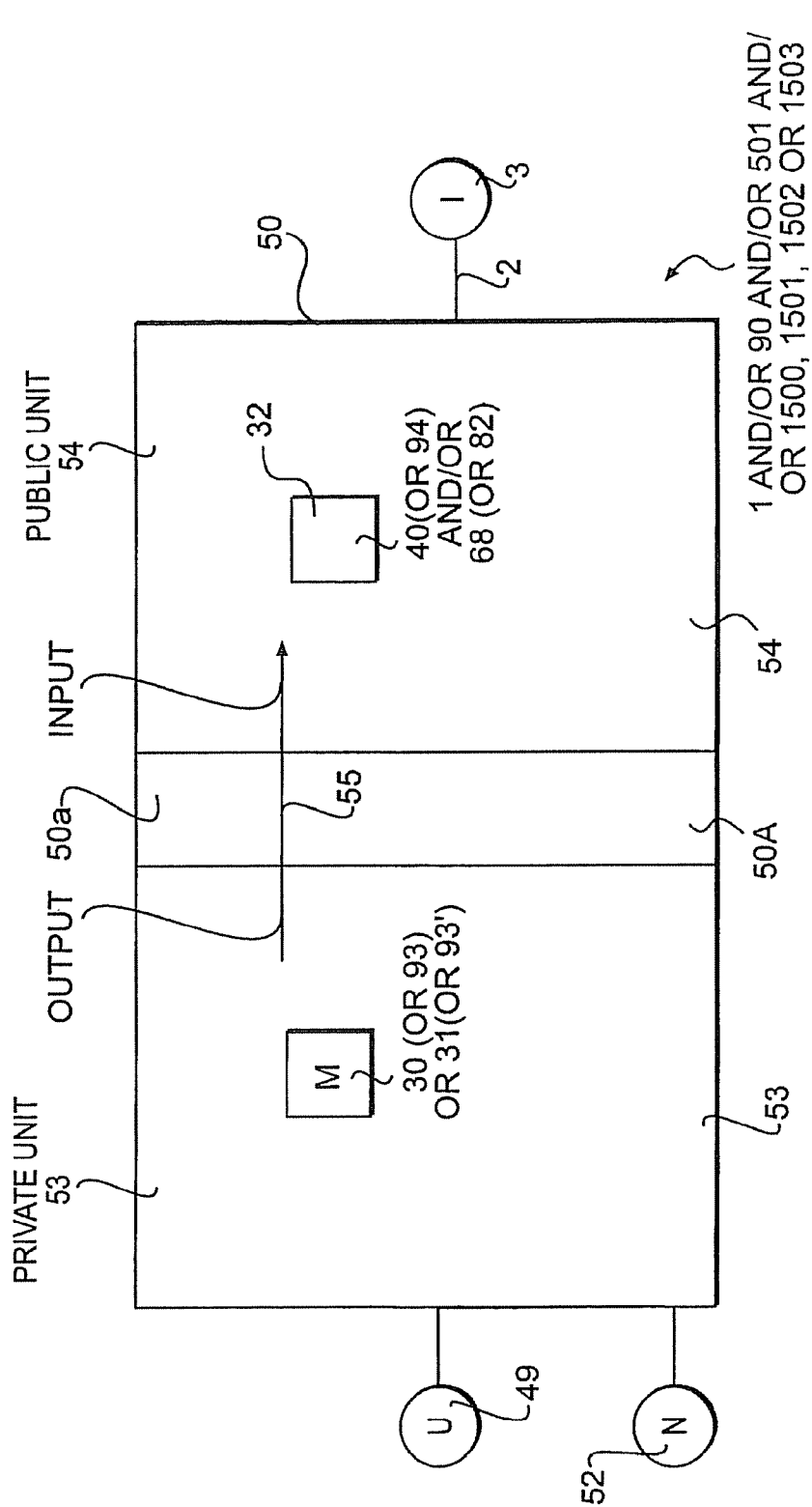
FIG. 2 shows an example embodiment similar to that shown in FIG. 1, including a personal computer 1 and/or microchip 90 (and/or 501) with an inner hardware-based access barrier or firewall 50 separating a Private Unit 53 disconnected from the Internet 3 and a Public Unit 54 connected to the Internet 3, but with the Private Unit 53 and Public Unit 54 connected only by a hardware-based access barrier or firewall 50a, for example in the form of a secure, out-only bus (or wire) or channel 55 (or in an alternate embodiment, a wireless connection, including radio or optical).

Similarly, FIG. 2 shows a useful architectural example embodiment of any computer or microchip, including a personal computer 1 and/or microchip 90 and/or 501 (or wafer 1500, 1501, 1502, or 1503) with an inner hardware-based access barrier or firewall 50 separating a Private Unit 53 that is disconnected by hardware from external networks 2 including the Internet 3 and a Public Unit 54 that is connected to external networks including the Internet 3.

In terms of communication between the two Units in the example shown in FIG. 2, the Private Unit 53 and Public Unit 54 are connected only by an inner hardware-based access barrier or firewall 50a in the form of a secure, out-only bus (or wire) or channel 55 that transmits data or code that is output from the Private Unit 53 to be input to the Public Unit 54. The user 49 controls the Private Unit 53-located master controlling device 30 (or 31 or 93 or 93'), which controls all traffic on the secure out-only bus or channel 55. Connections between the user 49 and the master controlling device 30 (or 31 or 93 or 93'), as well as between the master controlling device 30 (or 31 or 93 or 93') and any component controlled by it, can be for example hardwired on a motherboard (and/or executed in silicon on a microchip 90 and/or 501) to provide the highest level of security.

In the example shown in FIG. 2, there is no corresponding in-only bus or channel 56 transmitting data or code that is output from the Public Unit 54 to be input into the Private Unit 53. By this absence of any bus or channel into the Private Unit 53, all access from the Internet 3 or intervening network 2 to the Private Unit 53 is completely blocked on a permanent basis. Another example is an equivalent wireless connection between the two Units would require a wireless transmitter (and no receiver) in the Private Unit 53 and a receiver (and no transmitter) in the Public Unit 54, so the Private Unit 53 can only transmit data or code to the Public Unit 54 and the Public Unit 54 can only receive data or code from the Private Unit 53 (all exclusive of external wireless transmitters or receivers of the PC1 and/or microchip 90 and/or 501).

The Private Unit 53 can include any non-volatile memory, of which read-only memory and read/write memory of which flash memory (and hard drives and optical drives) are examples, and any volatile memory, of which DRAM (dynamic random access memory) is one common example.

An equivalent connection, such as a wireless (including radio and/or optical) connection, to the out-only bus or channel 55 between the two Units 53 and 54 would require at least one wireless transmitter in the Private Unit 53 and at least one receiver in the Public Unit 54, so the Private Unit 53 can transmit data or code to the Public Unit 54 only (all exclusive of external wireless transmitters or receivers of the PC1 and/or microchip 90 and/or 501).

An architecture for any computer or microchip (or nanochip) can have any number of inner hardware-based access barriers or firewalls 50a arranged in any configuration.

FIG. 2 also shows an example embodiment of a firewall 50 located on the periphery of the computer 1 and/or microchip 90 (and/or 501) controlling the connection between the computer and the network 2 and Internet 3; the firewall 50 can be hardwire-controlled directly by the master controlling device 30 (or 31 or 93 or 93'), for example.

Figure 3:
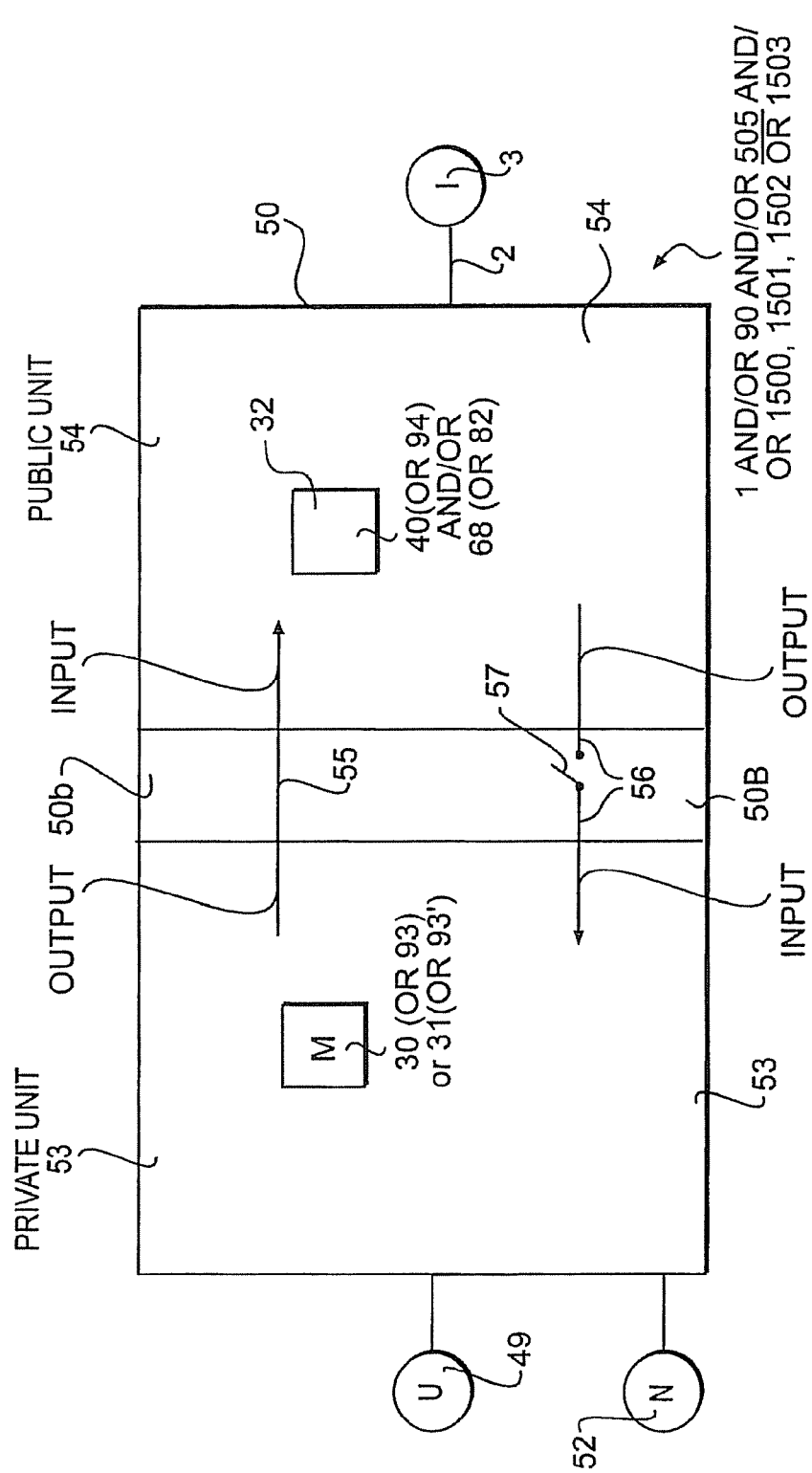
FIG. 3 is an example embodiment similar to that shown in FIG. 2, but with the Private Unit 53 and Public Unit 54 connected by a hardware-based access barrier or firewall 50b example that also includes an in-only bus or channel 56 that includes a hardware input on/off switch 57 or equivalent function signal interruption mechanism, including an equivalent functioning circuit on a microchip or nanochip.

FIG. 3 is a similar useful architectural example embodiment to that shown in FIG. 2, but with the Private Unit 53 and Public Unit 54 connected in terms of communication of data or code by an inner hardware-based access barrier or firewall 50b example that includes a secure, out-only bus or channel 55. The connection between units also includes an in-only bus or channel 56 that is capable of transmitting data or code that is output from the Public Unit 54 to be input into the Private Unit 53, strictly controlled by the master controller 30 (and/or 31 and/or 93 and/or 93') in the Private Unit 53. The in-only bus or channel 56 includes an input on/off switch (and/or microchip or nanochip circuit equivalent) 57 that can break the bus 56 Public to Private connection between Units, the switch 57 being controlled by the Private Unit 53-located master controlling device 30 (or 31 or 93 or 93'), which also controls all traffic on the in-only bus or channel 56; the control can be hardwired.

For one example, the master controller 30 (or 31 or 93 or 93') can by default use the on/off switch and/or micro-circuit (or nano-circuit) equivalent 57 to break the connection provided by the in-only bus or channel 56 to the Private Unit 53 from the Public Unit 54 whenever the Public Unit 54 is connected to the Internet 3 (or intermediate network 2). In an alternate example, the master controller 30 (or 31 or 93 or 93') can use the on/off switch and/or micro or nano-circuit equivalent 57 to make the connection provided by the in-only bus or channel 56 to the Private Unit 53 only when very selective criteria or conditions have been met first, an example of which would be exclusion of all input except when encrypted and from one of only a few authorized (and carefully authenticated) sources, so that Public Unit 54 input to the Private Unit 53 is extremely limited and tightly controlled from the Private Unit 53.

Another example is an equivalent connection, such as a wireless (including radio and/or optical) connection, to the in-only bus or channel 56 with an input on/off switch 57 between the two Units 53 and 54 would require at least one wireless receiver in the Private Unit 53 and at least one transmitter in the Public Unit 54, so the Private Unit 53 can receive data or code from the Public Unit 54 while controlling that reception of data or code by controlling its receiver, switching it either "on" when the Public Unit 54 is disconnected from external networks 2 and/or 3, for example, or "off" when the Public Unit 54 is connected to external networks 2 and/or 3 (all exclusive of external wireless transmitters or receivers of the PC1 and/or microchip 90 and/or 501).

An architecture for any computer and/or microchip (or nanochip) can have any number of inner hardware-based access barriers or firewalls 50b arranged in any configuration.

Figure 4:
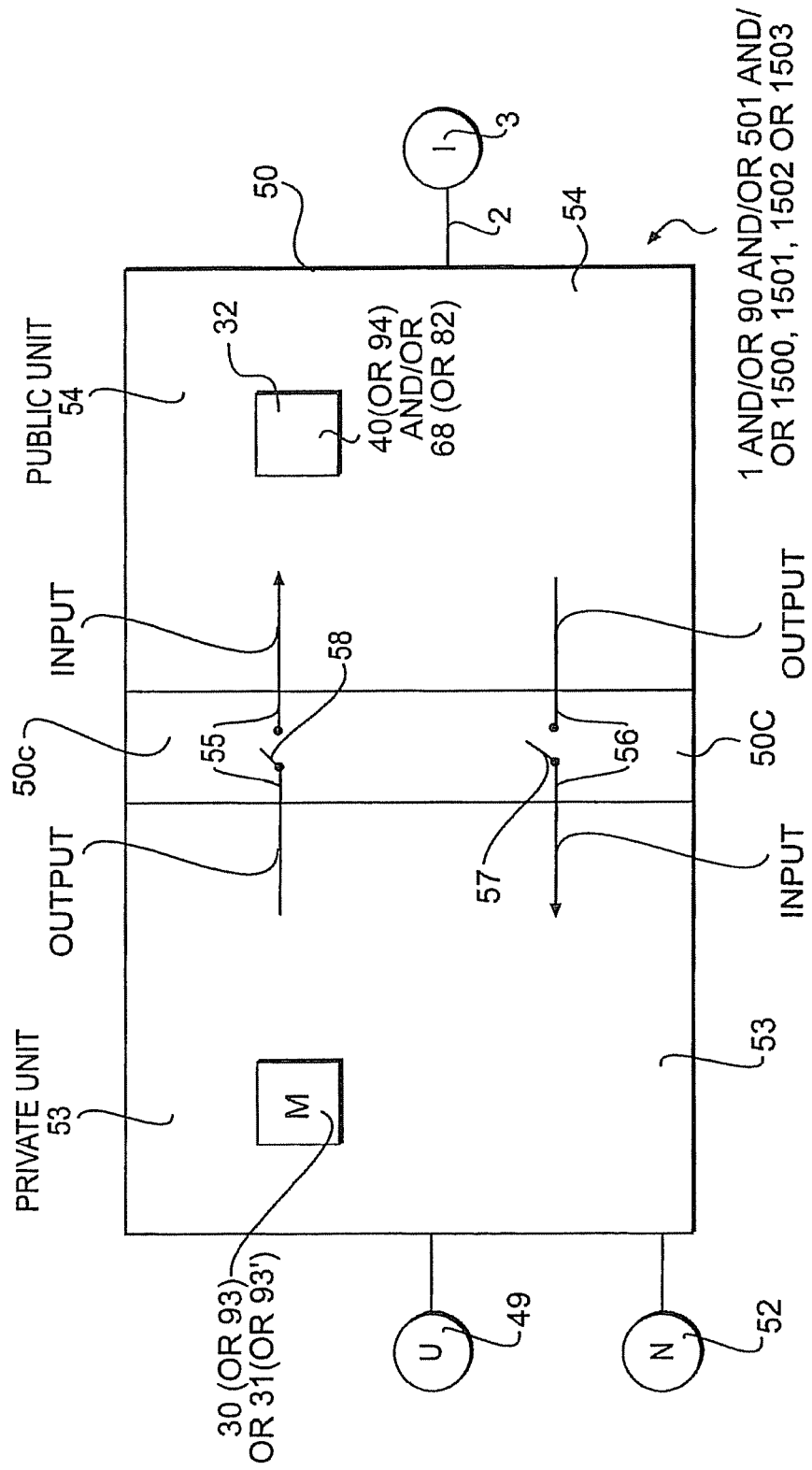
FIG. 4 is a similar example embodiment to that shown in FIGS. 2 and 3, but with Private Unit 53 and Public Unit 54 connected by a hardware-based access barrier or firewall 50c example that also includes an output on/off switch 58 or microcircuit equivalent on the secure, out-only bus or channel 55.

FIG. 4 is a similar useful architectural example embodiment to that shown in FIGS. 2 and 3, but with Private Unit 53 and Public Unit 54 connected in terms of communication of data or code by an inner hardware-based access barrier or firewall 50c example that also includes an output on/off switch and/or microcircuit equivalent 58 on the secure out-only bus or channel 55, in addition to the input on/off switch and/or microcircuit (or nano-circuit) equivalent 57 on the in-only bus or channel 56.

The output switch or microcircuit equivalent 58 is capable of disconnecting the Public Unit 54 from the Private Unit 53 when the Public Unit 54 is being permitted by the master controller 30 (or 31 or 93 or 93') to perform a private operation controlled (completely or in part) by an authorized third party user from the Internet 3, as discussed previously by the applicant relative to FIG. 17D and associated textual specification of the '657 Application incorporated above. The user 49 using the master controller 30 (or 31 or 93 or 93') always remains in preemptive control on the Public Unit 54 and can at any time for any reason interrupt or terminate any such third party-controlled operation. The master controller 30 (or 31 or 93 or 93') controls both on/off switches 57 and 58 and traffic (data and code) on both buses or channels 55 and 56 and the control can be hardwired.

Another example is an equivalent connection, such as a wireless connection, to the in-only bus or channel 56 and out-only bus or channel 55, each with an on/off switch 57 and 58 between the two Units 53 and 54, would require at least one wireless transmitter and at least one receiver in the Private Unit 53, as well as at least one transmitter and at least one receiver in the Public Unit 54, so the Private Unit 53 can send or receive data or code to or from the Public Unit 54 by directly controlling the "on" or "off" state of its transmitter and receiver, controlling that flow of data or code depending, for example on the state of external network 2 or Internet 3 connection of the Public Unit 54 (again, all exclusive of external wireless transmitters or receivers of the PC1 and/or microchip 90 and/or 501).

An architecture for any computer and/or microchip (or nanochip) can have any number of inner hardware-based access barriers or firewalls 50c arranged in any configuration.

Figure 5:
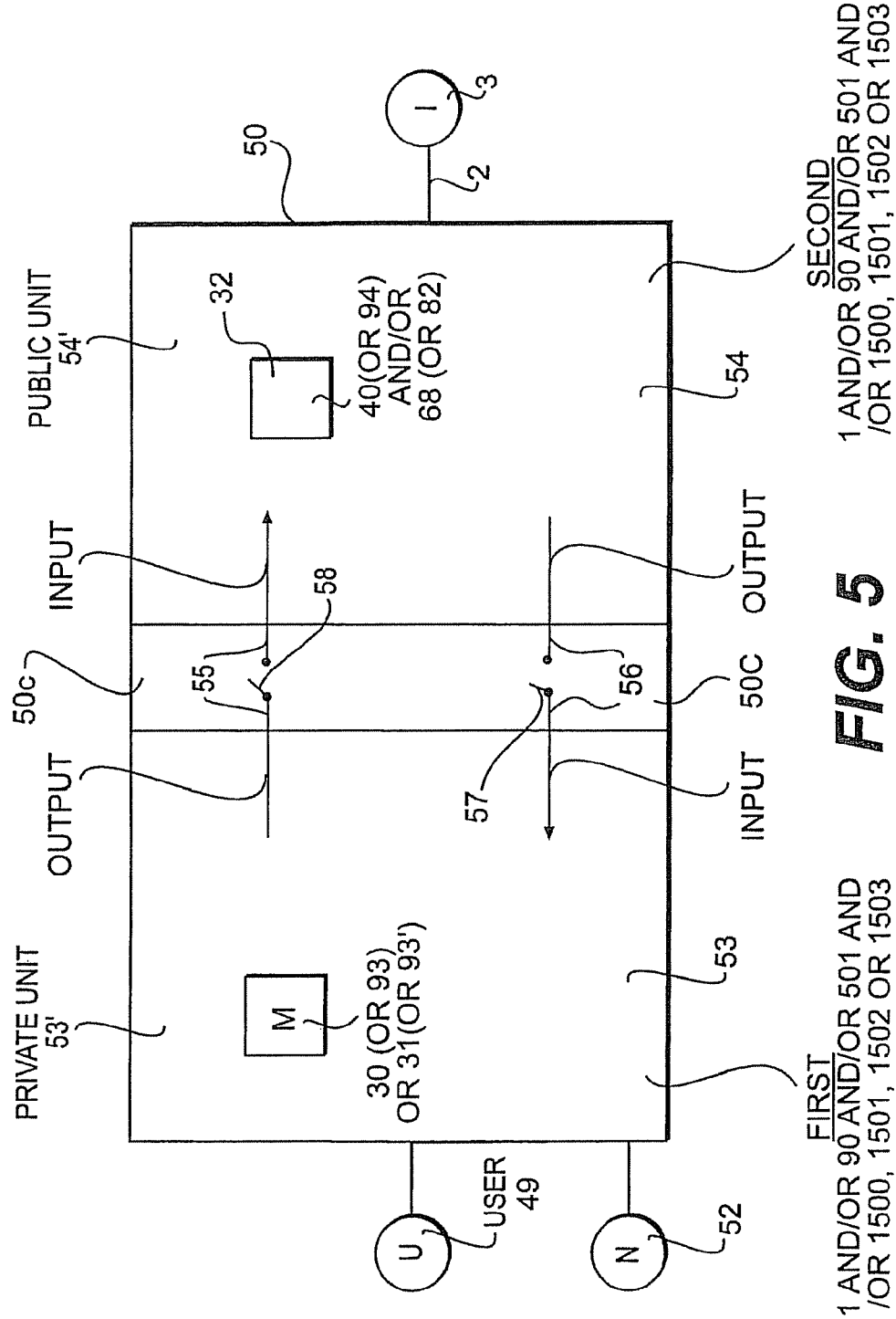
FIG. 5 shows an example embodiment of any computer such as a first personal computer 1 and/or microchip 90 (and/or 501) that is connected to a second computer such as a personal computer 1 and/or microchip 90 (and/or 501), the connection between computers made with the same hardware-based access barrier or firewall 50c example that includes the same buses or channels with on/off switches or equivalents as FIG. 4.

FIG. 5 shows an architectural example embodiment of a first computer (personal computer 1 and/or microchip 90 and/or 501 or wafer 1500, or 1501, 1502, or 1503) functioning as a Private Unit 53' that is connected to at least a second computer (or to a multitude of computers, including personal computers 1 and/or microchips 90 and/or 501 or 1500, 1501, 1502, or 1503) functioning as a Public Unit or Units 54'. The connection between the private computer 53' and the public computer or computers 54' is made including the same inner hardware-based access barrier or firewall 50c architecture that includes the same buses and channels 55 and 56 with the same on/off switches 57 and 58 as previously described above in the FIG. 4 example above and can use the same hardwire control. Alternatively, inner hardware-based access barriers or firewalls 50a or 50b can be used. In addition, inner hardware-based access barriers or firewalls 50a, 50b, and 50c can be used within the first and/or second computers.

The connection between the first and second computer can be any connection, including a wired network connection like the Ethernet, for example, or a wireless network connection, similar to the examples described above in previous FIGS. 2-4. In the Ethernet example, either on/off switch 57 or 58 can be functionally replaced like in a wireless connection by control of an output transmitter or an input receiver on either bus or channel 55 or 56; the transmitter or receiver being turned on or off, which of course amounts functionally to mere locating the on/off switches 55 or 56 in the proper position on the bus or channel 55 or 56 to control the appropriate transmitter or receiver, as is true for the examples in previous figures.

Figure 6:
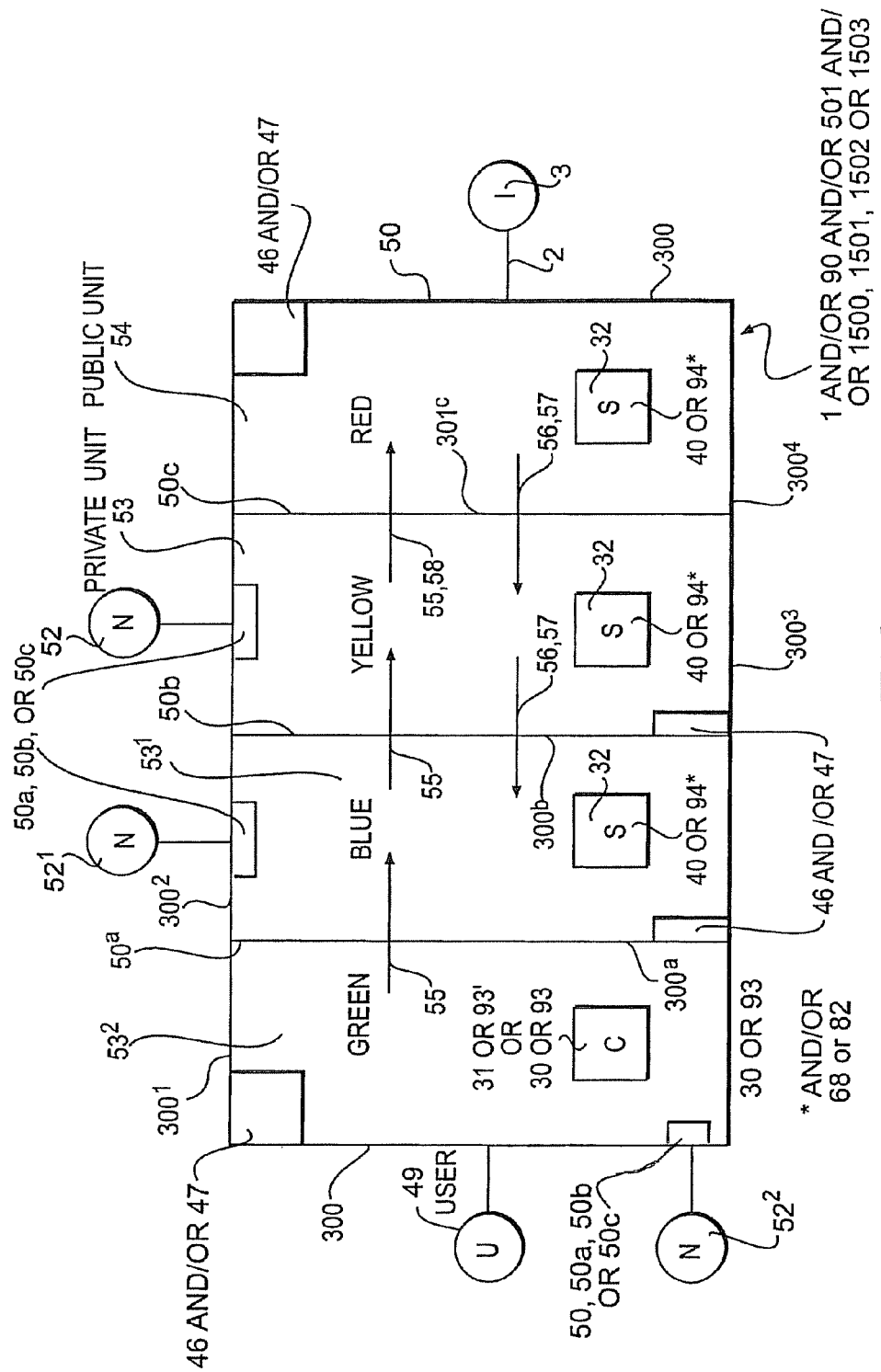
FIG. 6 shows an example embodiment of a personal computer 1 and/or microchip 90 (and/or 501) similar to FIGS. 23A and 23B of the '657 Application, which showed multiple access barriers or firewalls 50 with progressively greater protection, but with hardware-based access barriers or firewalls 50c, 50b, and 50a used successively from a inner private unit 53, to an intermediate more private unit $53^1$, and to an inner most private unit $53^2$, respectively.

FIG. 6 shows a useful architectural example embodiment of any computer (a personal computer 1 and/or microchip 90 and/or 501 or wafer 1500, 1501, 1502, or 1503) similar to FIGS. 23A and 23B of the '657 Application incorporated by reference above, which showed multiple inner firewalls 50 with progressively greater protection. FIG. 6 shows an example of an internal array of inner hardware-based access barriers or firewalls 50c, 50b, and 50a (described in previous FIGS. 2-4 above) used in a specific sequence between a public unit 54 and a first private unit 53, between the first private unit 53 and a more private second unit $53^1$, and between the more private second unit $53^1$ and a most private third unit $53^2$, respectively.

In addition, FIG. 6 shows a useful architectural example embodiment of one or more master controllers-only C (31 or 93') located in the most private unit $53^2$, with one or more microprocessors or processing units or "cores" S (40 or 94) located in the more private unit $53^1$, in the private unit 53, and in the public unit 54. Each of the microprocessors or processing units or cores S can have at least one secondary controller 32 with which it can be integrated, for example.

The microprocessors S (or processing units or cores) can be located in any of the computer units, but the majority in a many core architecture can be in the public unit to maximize sharing and Internet use. Alternatively, for computers that are designed for more security-oriented applications, a majority of the microprocessors S (or processing units or cores) can be located in the private units; any allocation between the public and private units is possible. Any other hardware, software, or firmware component or components can be located in the same manner as are microprocessors S (or master controllers-only C) described above.

An architecture for any computer and/or microchip or nanochip can have any number of inner hardware-based access barriers or firewalls 50a and/or 50b and/or 50c arranged in any combination or configuration.

As shown in FIG. 6, the private non-Internet network 52, which was discussed previously relative to FIG. 1, can consist in an example embodiment of more than one network, with each additional non-Internet network 52 being used to connect Private Units $53^2$, $53^1$, and 53 of one computer and/or microchip to separate non-Internet networks $52^2$, $52^1$ and 52, respectively, and that are connected to Private Units $53^2$, $53^1$, and 53, respectively, of other computers and/or microchips. That is, each computer and/or microchip Private Unit $53^2$, $53^1$, and 53 can have its own separate, non-Internet network $52^2$, $52^1$, and 52, respectively, and so that any Private Unit can be connected to other computer PC1 and/or microchip 90 (and/or 501) units of the same level of security; any Private Unit can also be subdivided into subunits of the same level of security. This is a useful embodiment example for making relatively local connections from business or home networks and scales up to large business servers, cloud, or supercomputers applications. The connections can be wired or wireless and local or non-local.

Similarly, a computer PC1 and/or microchip 90 or 501 Public Unit 54 can be subdivided into a number of different levels of security, for example, and each subdivided Public Unit 54 can have a separate, non-Internet connected network 52; and a subdivided Public Unit 54 can be further subdivided with the same level of security. In addition, any hardware component (like a hard drive or Flash memory device (and associated software or firmware), within a private (or public) unit of a given level of security can be connected by a separate non-Internet network 52 to similar components within a private (or public) unit of the same level of security.

Any configuration of access barriers or firewalls 50a and/or 50b and/or 50c can be located between any of the private non-Internet-connected networks $52^2$, $52^1$, and 52, and the Private Units $53^2$, $53^1$, and 53, respectively, providing a useful example of increased security control as shown in FIG. 6.

Also shown in the example embodiment of FIG. 6, each Private Unit $53^2$, $53^1$, and 53 can have one or more ports (or connections to one or more ports), like for a USB connection to allow for the use of one or more optional removable access and/or encryption or other keys 46, and/or one or more optional removable memory (such as a USB Flash memory thumbdrive) or other device 47, both of which as discussed previously in the text of FIG. 1, which example can also have one or more ports for either 46 and/or 47 and/or other device. The Public Unit 54 can also have one or more of any such removable devices, or ports like a USB port to allow for them.

Any data or code or system state, for example, for any Public or Private Unit 54 or 53 can be displayed to the personal user 49 and can be shown in its own distinctive color or shading or border (or any other visual or audible distinctive characteristic, like the use of flashing text). FIG. 6 shows an example embodiment of different colors indicated for each of the Units.

For embodiments requiring a higher level of security, it may be preferable to eliminate permanently or temporarily block (by default or by user choice, for example) the non-Internet network $52^2$ and all ports or port connections in the most private unit $53^2$.

The public unit 54 can be subdivided into an encrypted area (and can include encryption/decryption hardware) and an open, unencrypted area, as can any of the private units 53; in both cases the master central controller 30, 31, 93, or 93' can control the transfer of any or all code or data between an encrypted area and an unencrypted area considering factors such authentication.

The invention example structural and functional embodiments shown in the above described FIGS. 1-6, as well as the following FIGS. 7-16 and the associated textual specification of this application all most directly relate to the example structural and functional embodiments of the inner firewall 50 described in FIGS. 10A-10D, 10J-10Q, 17A-17D, 23A-23E, 24, 25A-25D and 27A-27G, and associated textual specification, of the above '657 Application incorporated by reference.

Figure 7:
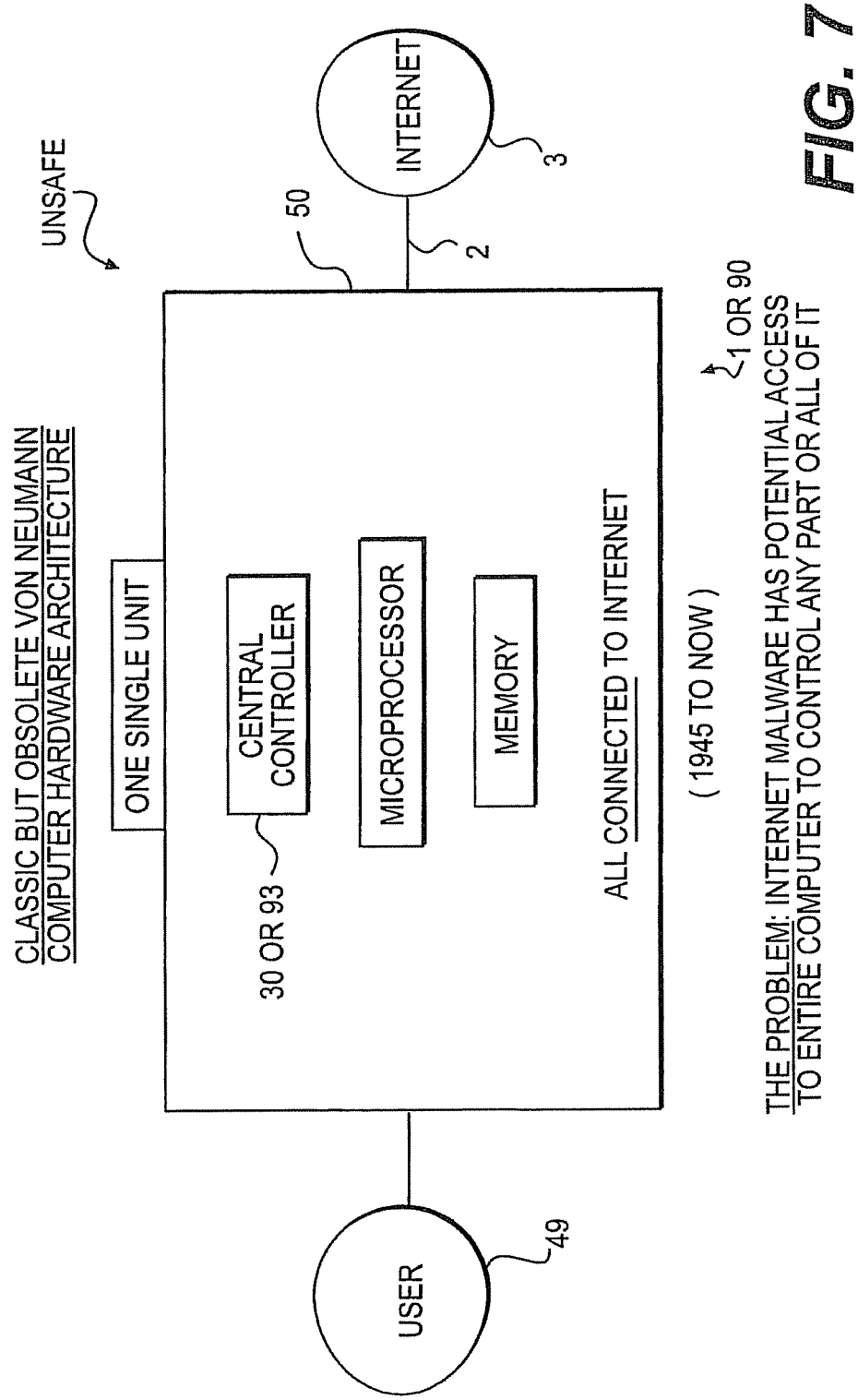
FIG. 7 shows a schematic illustration of a classic Von Neumann computer hardware architecture.

FIG. 7 shows the fundamental security problem caused by the Internet connection to the classic Von Neumann computer hardware architecture that was created in 1945. At that time there were no other computers and therefore no networks of even the simplest kind, so network security was not a consideration in its fundamental design, which is unsafe for use when connected to an open insecure public network of enormous scale, such as the Internet.

FIGS. 8-14 are useful architectural example embodiments of the inner hardware-based access barriers or firewalls 50a, 50b, and 50c.

Figure 8:
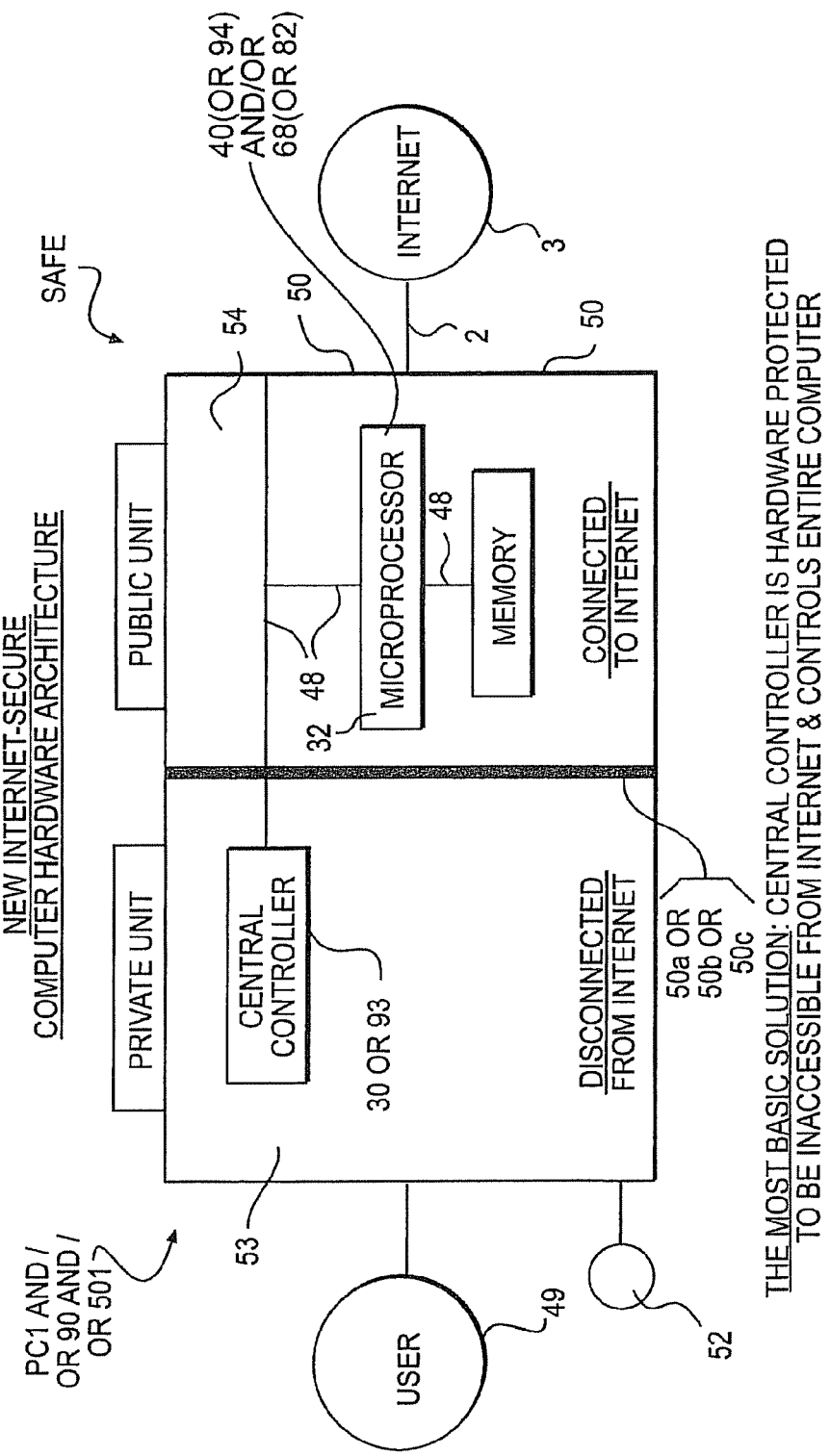
FIGS. 8-14 are additional architectural schematic embodiment examples of 48 the use of hardware-based access barriers or firewalls 50a, 50b, and 50c to create multiple compartments, as well as secure control buses and Faraday Cages.

FIG. 8 shows a useful example embodiment of the applicant's basic architectural solution to the fundamental security problem caused by the Internet, the solution being to protect the central controller of the computer with an inner firewall 50 controlling access by the Internet, as discussed in detail in FIGS. 10A-10D and 10J-10Q, and associated textual specification of the '657 Application, those specific drawing and text portions of which are incorporated by reference in this application; they were discussed as well as earlier in this application. FIG. 8 and subsequent figures describe example embodiments of a number of specific forms of an inner hardware-based access barrier or firewall 50, such as access barriers or firewalls 50a and/or 50b and/or 50c as described previously in this application; the number and potential configurations of access barriers or firewalls 50a and/or 50b and/or 50c within any computer, such as computer PC 1 and/or microchip 90 (and/or 501) is without any particular limit.

Figure 9:
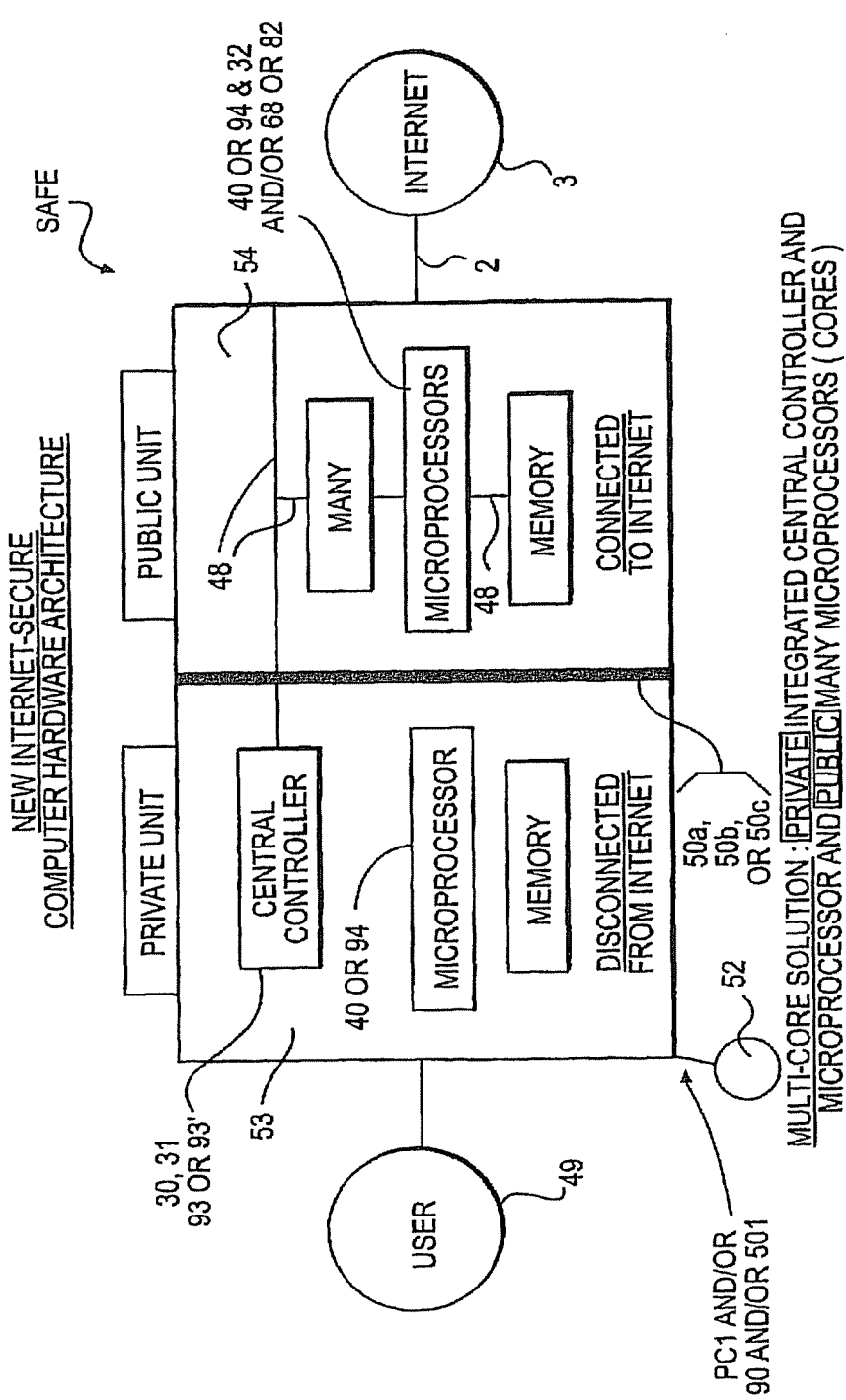

FIG. 9 is a similar embodiment to FIG. 8, but also showing a useful architectural example of a central controller integrated with a microprocessor to form a conventional general purpose microprocessor or CPU (like an Intel x86 microprocessor, for example). FIG. 8 also shows a computer PC1 and/or microchip 90 and/or 501 with many microprocessors or cores.

Figure 10:
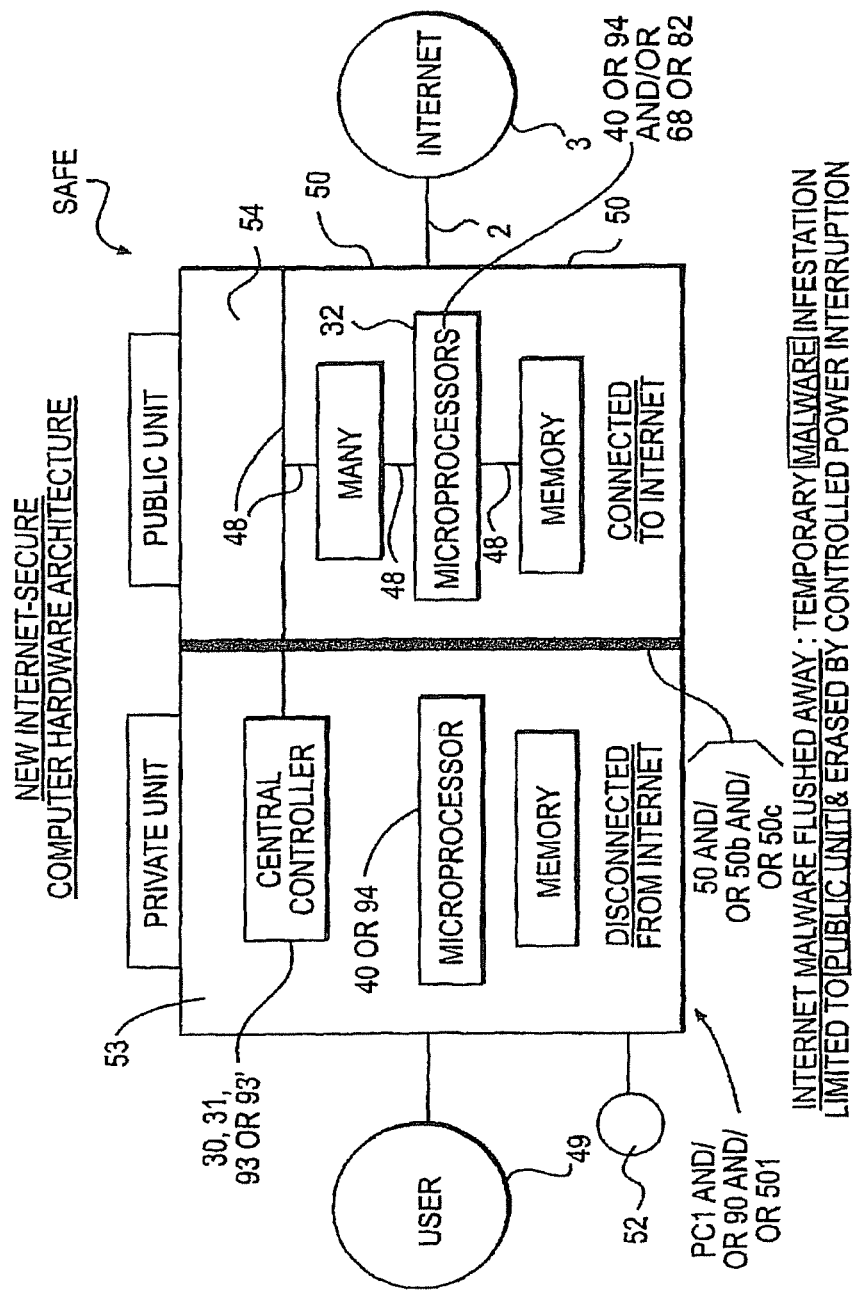

FIG. 10 is the same embodiment as FIG. 9, but also shows a major functional benefit of the applicant's access barrier or firewall 50a, 50b, and 50c invention, which is to enable a function to flush away Internet malware by limiting the memory access of malware to DRAM 66 (dynamic random access memory) in the Public Unit 54, which is a useful example of a volatile memory that can be easily and quickly erased by power interruption. The flushing function of a firewall 50 was discussed earlier in detail in FIGS. 25A-25D and associated textual specification of the '657 Application and those specific drawing and text portions of the '657 Application are incorporated by reference herein.

Figure 11:
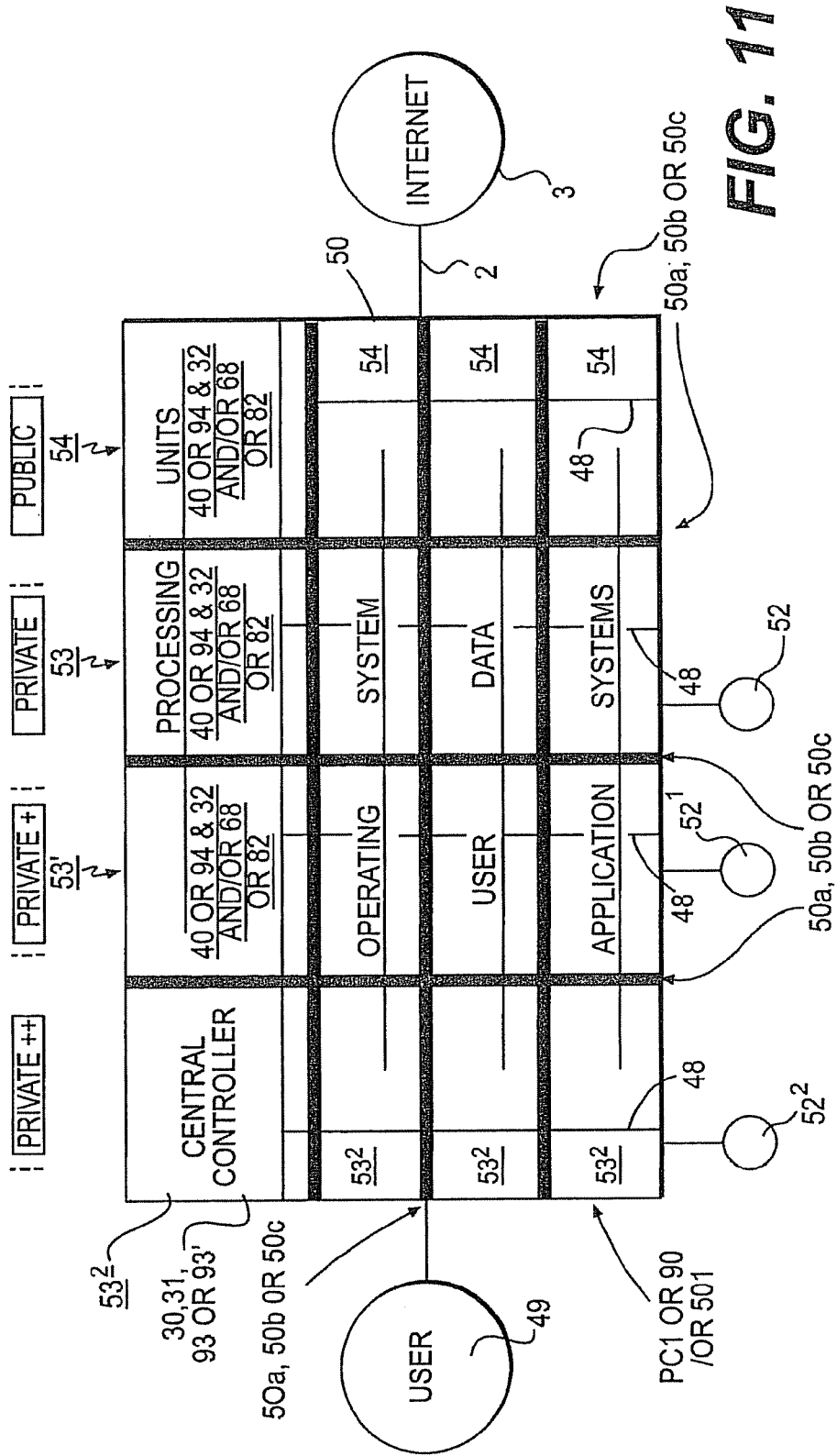

FIG. 11 is a useful example embodiment similar to FIG. 6 and shows that any computer or microchip can be partitioned into many different layers of public units 54 and private units 53 using an architectural configuration of access barriers or firewalls 50a, 50b, and 50c; the number and arrangement of potential configurations is without any particular limit; and the number of microprocessors 40 or 94 and/or 68 or 82 in the public unit 53 can be potentially any number, including 1 or 2 or 3 or at least 4 or 8 or 16 or 32 or 64 or 128 or 256 or 512 or 1024 or many more, as could potentially be the case in prior or subsequent figures. The partition architecture provided by firewalls 50 was discussed earlier in detail in FIGS. 23A-23B and associated textual specification of the '657 Application and those specific drawing and text portions are incorporated by reference herein.

Figure 12:
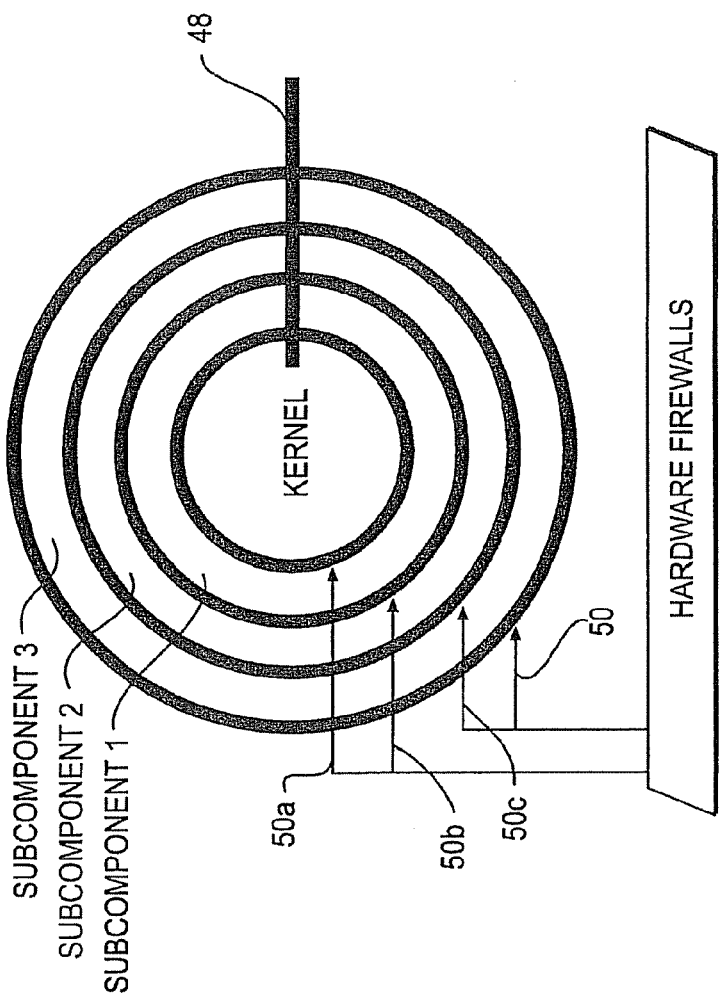

FIG. 12 is another useful architectural example embodiment of the layered use of access barriers or firewalls 50, 50c, 50b, and 50c based on a kernel or onion structure; the number of potential configurations including relative to layers or types of access barriers or firewalls is without any particular limit. This structure was discussed in detail relative to firewalls 50 in FIGS. 23D-23E and associated textual specification of the '657 Application and those specific drawing and text portions are incorporated by reference herein.

Figure 13:
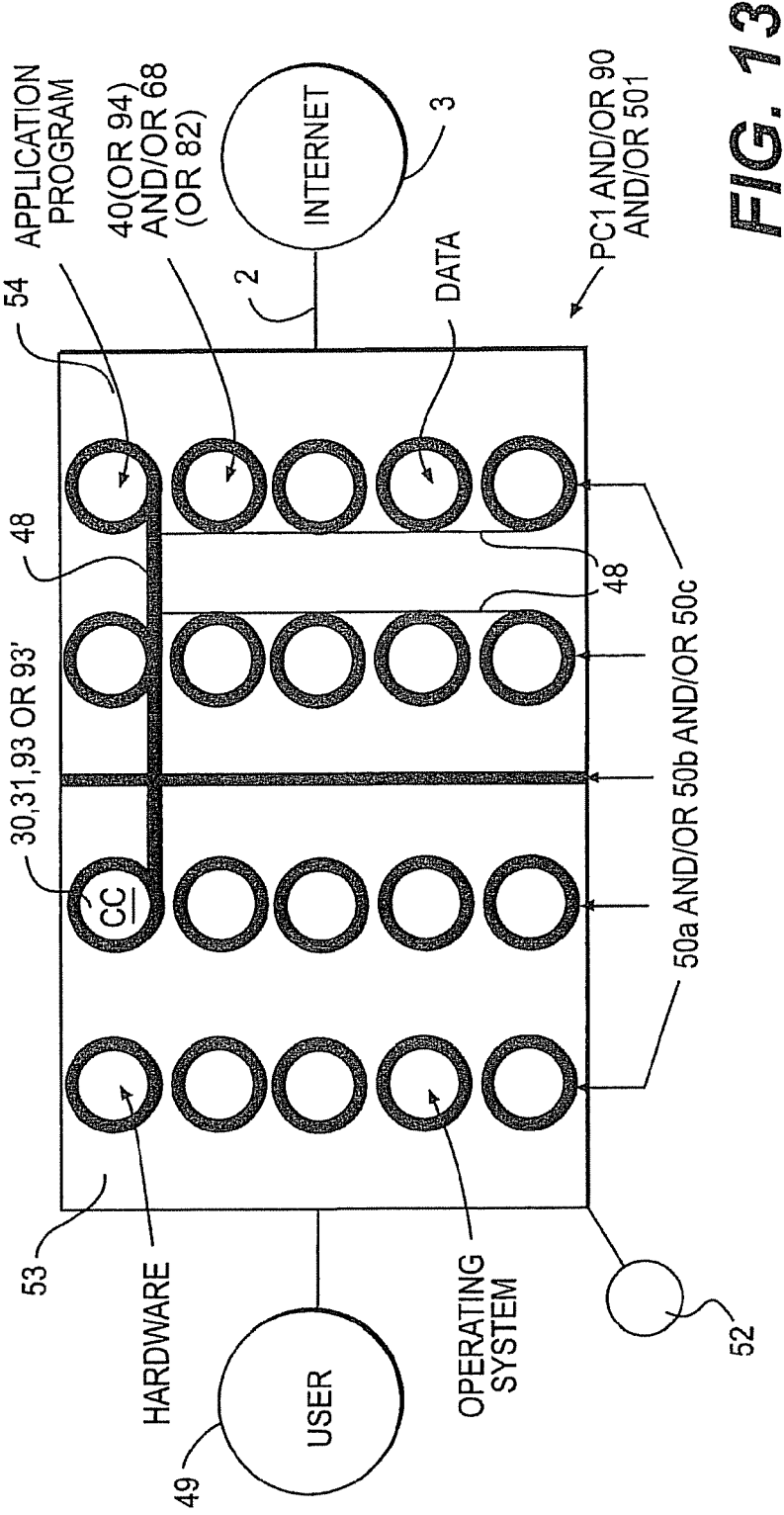

FIG. 13 is a useful architectural example embodiment showing the presence of many FIG. 12 example embodiments with layered access barriers or firewalls 50a, 50b, and 50c structures on all of the many hardware, software, and/or firmware components of a computer; the number of FIG. 12 embodiments or their potential configurations including relative to layers or types of access barriers or firewalls is without any particular limit in either the private unit 53 or the public unit 54 of any computer or microchip. The many layered kernels structure was discussed in more detail in FIG. 23C and associated textual specification of the '657 Application and those specific drawing and text portions are incorporated by reference earlier. Note that any subcomponent or kernel of the FIG. 12 example embodiment can be protected by a hardware-based access barrier 50a (or 50b or 50c or 50), a secure, out-only bus or channel 55, and therefore can for example be effectively disconnected from any input from any network, including either the secure private network 52 and the insecure public network including the Internet 3.

Figure 14:
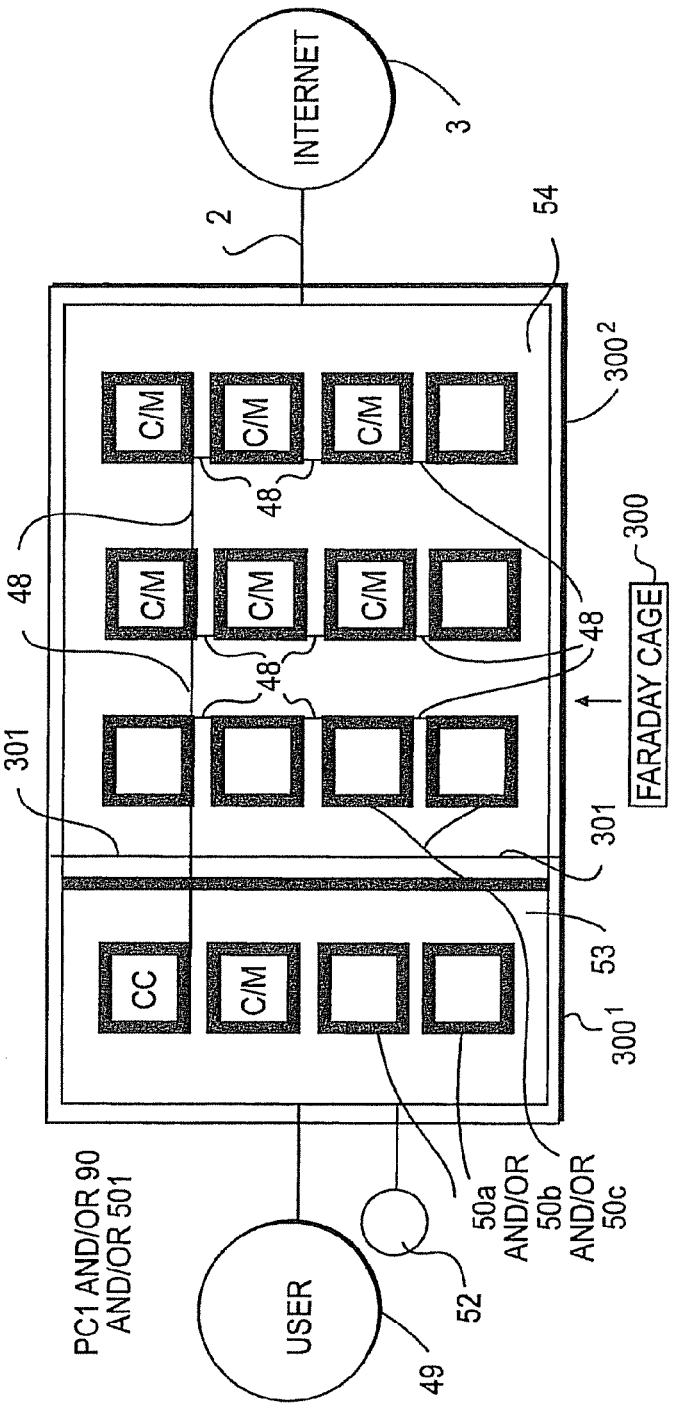

FIG. 14 is a useful architectural example embodiment similar to FIG. 13, but also showing the computer PC1 and/or microchip 90 and/or 501 surrounded by a Faraday Cage 300; the number of potential similar configurations is without any particular limit. This use of Faraday Cages 300 was discussed in detail in FIGS. 27A-27G and associated textual specification of the '657 Application and those specific drawing and text portions are incorporated by reference herein.

FIG. 14 shows a useful example embodiment of a Faraday Cage 300 surrounding completely a computer PC1 and/or microchip 90 and/or 501. The Faraday Cage 300 can be subdivided by an example partition 301 to protect and separate the Private Unit 53 from the Public Unit 54, so that the Private Unit 53 is completely surrounded by Faraday Cage $300^1$ and Public Unit 54 is completely surrounded by Faraday Cage $300^2$, in the example embodiment shown. Each unit can alternatively have a discrete Faraday Cage 300 of its own, instead of partitioning a larger Faraday Cage 300 and the surrounding of a Unit can be complete or partial. Any number or configuration of Faraday Cages can be used in the manner shown generally in FIG. 14, including a separate Faraday Cage for any hardware component of the computer or microchip.

The example embodiments shown in FIGS. 1-4, 6-11, and 13-16 are a computer of any sort, including a personal computer PC1; or a microchip 90 or 501, including a microprocessor or a system on a chip (SoC) such as a personal computer on a microchip 90; or a combination of both, such as a computer with the architecture shown in FIGS. 1-4, 6-11, and 13-16, the computer also including one or more microchips also with the architecture shown in FIGS. 1-4, 6-11, and 13-16.

The Public Unit 54 shown in FIGS. 1-6, 8-11, and 13-14 can be used in a useful embodiment example to run all or a part of any application (or "apps") downloaded from the Internet or Web, such as the example of any of the many thousands of apps for the Apple iPhone that are downloaded from the Apple Apps Store, or to run applications that are streamed from the Internet or Web. Similarly, all or part of a video or audio file like a movie or music can be downloaded from the Web and played in the Public Unit 54 for viewing and/or listening be the computer user 49.

Some or all personal data pertaining to a user 49 can be kept exclusively on the user's computer PC1 and/or microchip 90 and/or 501 for any cloud application or app to protect the privacy of the user 49 (or kept non-exclusively as a back-up), unlike conventional cloud apps, where the data of a personal user 49 is kept in the cloud and potentially intentionally shared or carelessly compromised without authorization by or knowledge of the personal user 49. In effect, the Public Unit 54 can be a safe and private local cloud, with personal files retained there or in the Private Unit 53. All or part of an app can also potentially be downloaded or streamed to one or more Private Units, including $53^2$, $53^1$, and 53.

Privacy in conventional clouds can also be significantly enhanced using the inner hardware-based access barriers or firewalls 50a and/or 50b and/or 50c described in this application, since each individual or corporate user of the cloud can be assured that their data is safe because it can be physically separated and segregated by hardware, instead of by software alone, as is the case currently.

Similarly, the example embodiment of FIG. 6 shows a computer and/or microchip Public Unit 54 and Private Units 53, $53^1$, and $53^2$, each with a separate Faraday Cage. $300^4$, $300^3$, $300^2$, and $300^1$, respectively, that are created using partitions $301^c$, $301^b$, and $301^a$, respectively. Any Public Unit 54 or Private Unit 53 can be protected by its own Faraday Cage 300. The Faraday Cage 300 can completely or partially surround the any Unit in two or three dimensions.

FIGS. 8-11 and 13-14 also show example embodiments of a secure control bus (or wire or channel) 48 that connects the master controlling device 30 (or 31) or master control unit 93 (or 93') or central controller (as shown) with the components of the computer PC1 and/or microchip 90 and/or 501, including those in the Public Unit 54. The secure control bus 48 provides hardwired control of the Public Unit 54 by the central controller in the Private Unit 53. The secure control bus 48 can be isolated from any input from the Internet 3 and/or an intervening other network 2 and/or from any input or monitoring from any or all parts of the Public Unit 54. The secure control bus 48 can provide and ensure direct preemptive control by the central controller over any or all the components of the computer, including the Public Unit 54 components. The secure control bus 48 can, partially or completely, coincide or be integrated with the bus 55, for example. The secure control bus 48 is configured in a manner such that it cannot be affected, interfered with, altered, read or written to, or superseded by any part of the Public Unit 54 or any input from the Internet 3 or network 2, for example. A wireless connection can also provide the function of the secure control bus 48 in a manner similar to that describing wireless connections above in FIGS. 2-6 describing buses 55 and 56.

The secure control bus 48 can also provide connection for the central controller to control a conventional firewall or for example access barrier or firewall 50c located on the periphery of the computer or microchip to control the connection of the computer PC1 and/or microchip 90 and/or 501 to the Internet 3 and/or intervening other network 2.

The secure control bus 48 can also be used by the master central controller 30, 31, 93, or 93' to control one or more secondary controllers 32 located on the bus 48 or anywhere in the computer PC1 and/or microchip 90 and/or 501, including in the Public Unit 54 that are used, for example, to control microprocessors or processing units or cores S (40 or 94) located in the Public Unit 54. The one or more secondary controllers 32 can be independent or integrated with the microprocessors or processing units or cores S (40 or 94) shown in FIGS. 9 and 11 above, for example; such integrated microprocessors can be a special purpose design or a common general purpose microprocessors like an Intel x86 microprocessor, for example.

Figure 15:
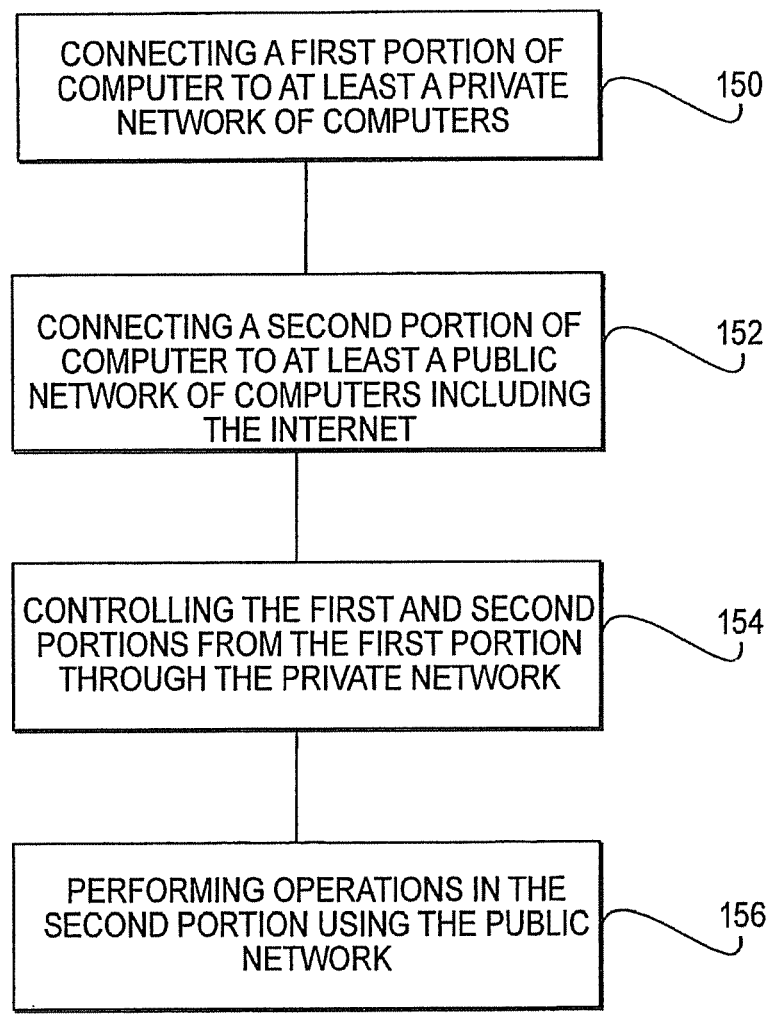
FIGS. 15 and 16 illustrate methods in accordance with the present disclosure.

In accordance with the present disclosure, a method of protecting a computer is disclosed in FIG. 15. The computer includes may include a master controlling device that is configured using hardware and firmware; at least two general purpose microprocessors; a protected portion of the computer; an unprotected portion of the computer; and an inner hardware-based access barrier or firewall that is located between the protected portion of the computer and the unprotected portion of the computer, the protected portion including at least the master controlling device and at least one of the microprocessors, and the unprotected portion including at least one of the microprocessors, the at least one microprocessor of the unprotected portion being separate from and located outside of the inner hardware-based access barrier or firewall. As shown in FIG. 15, the method of protecting a computer includes connecting a first portion of the computer through at least a first connection to at least a private network of computers (150); connecting a second portions of the computer through a second connection to at least a public network of computers including the Internet (152); controlling the first and second portions of the computer from the first portion through the private network (154); and performing operations in the second portion using the public network (156).

Figure 16:
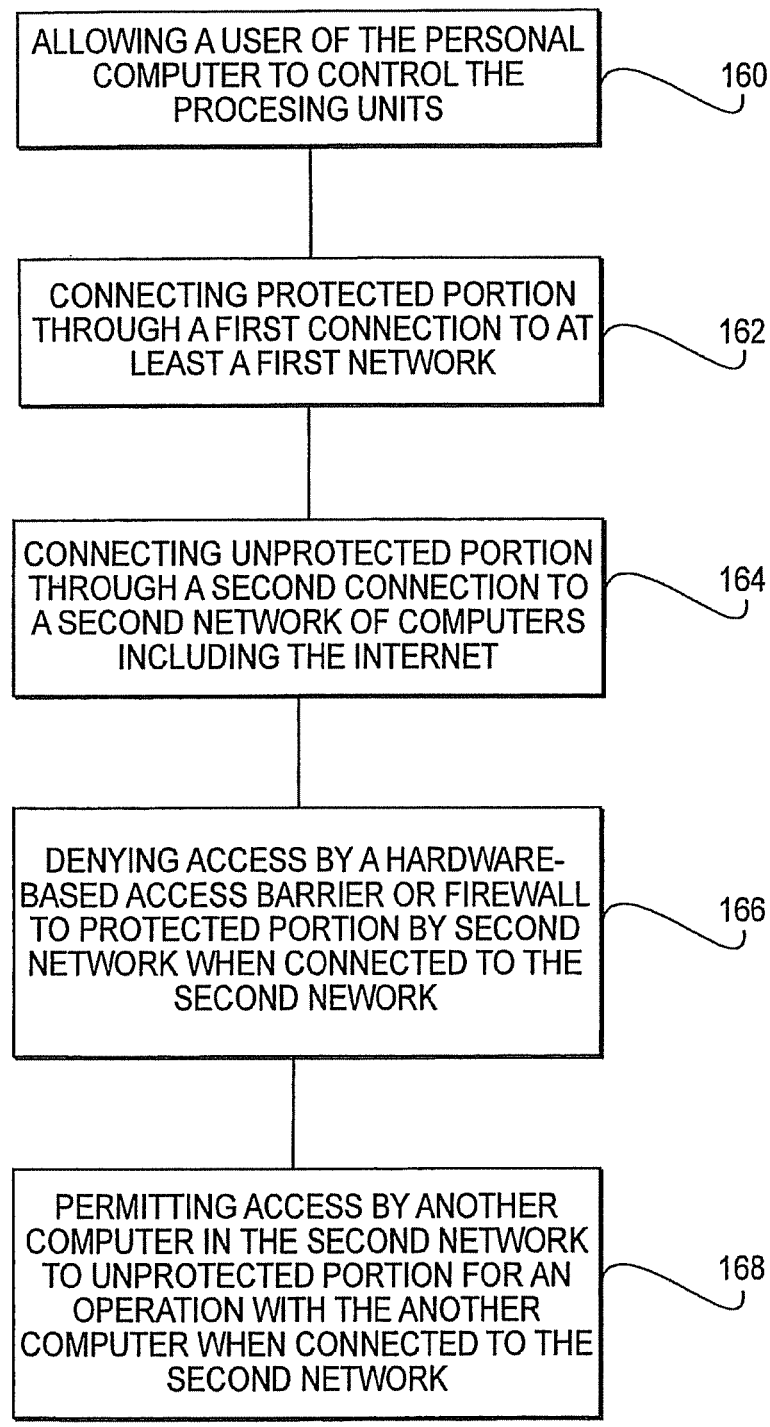

In accordance with the present disclosure, a method of protecting a computer is disclosed in FIG. 16. The computer may include a master controlling device that is configured using hardware and firmware; at least two general purpose microprocessors; a protected portion of the computer; an unprotected portion of the computer; and an inner hardware-based access barrier or firewall that is located between the protected portion of the computer and the unprotected portion of the computer, the protected portion including at least the master controlling device and at least one of the microprocessors, and the unprotected portion including at least one of the microprocessors, the at least one microprocessor of the unprotected portion being separate from and located outside of the inner hardware-based access barrier or firewall. As shown in FIG. 16, the method includes allowing a user of the computer to control the microprocessors (160); connecting the protected portion of the computer through a first connection to at least a secure private network of computers (162); connecting the unprotected portion of the computer through a second connection to an insecure public network of computers including the Internet (164); denying access by the hardware-based access barrier or firewall to the protected portion of the computer by the insecure public network when the personal computer is connected to the insecure public network (166); and permitting access by any other computer in the insecure public network to the one or more of the processing units included in the unprotected portion of the computer for an operation with the any other computer in the insecure public network when the personal computer is connected to the insecure public network (168).

Any one or more features or components of FIGS. 1-16 of this application can be usefully combined with one or more features or components of FIGS. 1-31 of the above '657 U.S. Application or FIGS. 1-27 of the above '769 U.S. Application. Each of the above '657 and '769 Applications and their associated U.S. publications are expressly incorporated by reference in its entirety for completeness of disclosure of the applicant's combination of one or more features or components of either of those above two prior applications of this applicant with one or more features or components of this application. All such useful possible combinations are hereby expressly intended by this applicant.

Furthermore, any one or more features or components of FIGS. 1-16 of this application can be usefully combined with one or more features or components of the figures of the above '049 and '553 U.S. Applications, as well as in the above '428, '250, '141, '449, '906, '275, '020, '854, '529, '756, and '233 U.S. Patents. Each of the above '049 and '553 Applications and their associated U.S. publications, as well as the above '428, '250, '141, '449, '906, '275, '020, '854, '529, '756, and '233 U.S. Patents are expressly incorporated by reference in its entirety for completeness of disclosure of the applicant's combination of one or more features or components of either of those above two prior applications of this applicant with one or more features or components of this application. All such useful possible combinations are hereby expressly intended by this applicant.

In addition, one or more features or components of any one of FIGS. 1-16 or associated textual specification of this application can be usefully combined with one or more features or components of any one or more other of FIGS. 1-16 or associated textual specification of this application. And any such combination derived from the figures or associated text of this application can also be combined with any feature or component of the figures or associated text of any of the above incorporated by reference U.S. Applications '657, '769, '049, and '553, as well as U.S. Pat. Nos. '428, '250, '141, '449, '906, '275, '020, '854, '529, '756, and '233.

The invention claimed is:

1. A computer or microchip configured to be securely controlled, said computer or microchip comprising:
   at least a first microprocessor, core or processing unit configured to connect to a network of computers including the Internet;
   at least a master controlling device for the computer or microchip wherein said master controlling device comprises at least a second microprocessor, core or processing unit; and
   a secure control bus that connects at least said master controlling device with at least said at least said first microprocessor, core or processing unit, and said secure control bus being isolated from input from said network of computers including the Internet and input from components of said computer or microchip other than said master controlling device; and
      said master controlling device being configured for securely controlling at least one operation executed by at least one said microprocessor, core or processing unit, said secure control being provided by said master controlling device via said secure control bus.

2. The computer or microchip of claim 1, wherein said computer or microchip further comprises an unprotected public unit and said secure control bus provides and ensures direct preemptive control by said master controlling device over said unprotected public unit.

3. The computer or microchip of claim 2, wherein said at least a second microprocessor, core or processing unit is a general purpose microprocessor, core or processing unit.

4. The computer or microchip of claim 2, wherein said master controlling device comprises a non-volatile memory.

5. The computer or microchip of claim 2, wherein said secure control bus is configured such that it cannot be affected, interfered with, altered or written to, or superseded by any part of said unprotected public unit or by input from said network of computers including the Internet.

6. The computer or microchip of claim 2, wherein said master controlling device controls through said secure control bus one or more secondary controllers that are located on said secure control bus.

7. The computer or microchip of claim 6, wherein said one or more secondary controllers are located in the unprotected public unit.

8. The computer or microchip of claim 7, wherein said one or more secondary controllers are used to control one or more of said at least one microprocessor, core or processing unit located in said unprotected public unit.

9. The computer or microchip of claim 8, wherein said one or more secondary controllers are integrated with one or more of said at least one microprocessor, core or processing unit located in said unprotected public unit.

10. The computer or microchip of claim 2, wherein said secure control bus is wired, wireless or a channel.

11. The computer or microchip of claim 2, wherein said secure control bus provides a connection to control a firewall located on a periphery of said computer or microchip.

12. The computer or microchip of claim 2, wherein said secure control bus connects at least said master controlling device with at least two of said microprocessors, cores or processing units located in said unprotected public unit.

13. The computer or microchip of claim 2, wherein said secure control bus connects at least said master controlling device with at least six of said microprocessors, cores or processing units located in said unprotected public unit.

14. The computer or microchip of claim 2, wherein said at least a first microprocessor, core or processing unit is a general purpose microprocessor, core or processing unit.

15. A computer or microchip configured to be securely controlled through a private network of computers, said computer or microchip comprising:
    at least one network connection for connection to a network of computers including the Internet;
    at least a separate private network connection for connection to at least said private network of computers, at least said separate private network connection being located in a hardware protected area of said computer or microchip,
    at least a first microprocessor, core or processing unit configured to connect to said at least one network connection for connection to network of computers including the Internet;
    at least a master controlling device for the computer or microchip located in said hardware protected area wherein said master controlling device comprises at least a second microprocessor, core or processing unit; and
    a secure control bus that connects at least said master controlling device with said at least a first microprocessor, core or processing unit, said secure control bus being isolated from input from said network of computers including the Internet and input from components of said computer or microchip other than said master controlling device; and
    said master controlling device being configured for securely controlling at least one operation executed by said at least a first microprocessor, core or processing unit, said secure control being provided by said master controlling device through said private network of computers to said separate private network connection in said hardware protected area and through said secure control bus.

16. The computer or microchip of claim 15, wherein said computer or microchip further comprises an unprotected public unit and said secure control bus provides and ensures direct preemptive control by said master controlling device over said unprotected public unit.

17. The computer or microchip of claim 16, wherein said at least said second microprocessor, core or processing unit is a general purpose microprocessor, core or processing unit.

18. The computer or microchip of claim 16, wherein said master controlling device comprises a non-volatile memory.

19. The computer or microchip of claim 16, wherein said secure control bus is configured such that it cannot be affected, interfered with, altered or written to, or superseded by any part of said unprotected public unit or by input from said network of computers including the Internet.

20. The computer or microchip of claim 16, wherein said master controlling device controls through said secure control bus one or more secondary controllers that are located on said secure control bus.

21. The computer or microchip of claim 20, wherein said one or more secondary controllers are located in the unprotected public unit.

22. The computer or microchip of claim 21, wherein said one or more secondary controllers are used to control one or more of said at least a first microprocessor, core or processing unit located in said unprotected public unit.

23. The computer or microchip of claim 22, wherein said one or more secondary controllers are integrated with one or more of said at least a first microprocessor, core or processing unit located in said unprotected public unit.

24. The computer or microchip of claim 16, wherein said secure control bus is wired, wireless or a channel.

25. The computer or microchip of claim 16, wherein said secure control bus provides a connection to control a firewall located on a periphery of said computer or microchip.

26. The computer or microchip of claim 16, wherein said secure control bus connects at least said master controlling device with at least two of said at least a first microprocessor, core or processing unit located in said unprotected public unit.

27. The computer or microchip of claim 16, wherein said secure control bus connects at least said master controlling device with at least six of said at least a first microprocessor, core or processing unit located in said unprotected public unit.

28. The computer or microchip of claim 16, wherein said at least a first microprocessor, core or processing unit is a general purpose microprocessor, core or processing unit.

29. A computer or microchip configured to be securely controlled, said computer or microchip comprising:
    at least one microprocessor, core or processing unit configured to connect to a network of computers including the Internet;
    at least a master controlling device for the computer or microchip; and
    a secure control bus that connects at least said master controlling device with at least said at least one microprocessor, core or processing unit, and said secure control bus being isolated from input from said network of computers including the Internet and input from components of said computer or microchip other than said master controlling device; and
    said master controlling device being configured for securely controlling at least one operation executed by at least one said microprocessor, core or processing unit, said secure control being provided by said master controlling device via said secure control bus.

30. The computer or microchip of claim 29, wherein said master controlling device comprises a non-volatile memory.

31. The computer or microchip of claim 29, wherein said computer or microchip further comprises an unprotected public unit and said secure control bus provides and ensures direct preemptive control by said master controlling device over said unprotected public unit.

32. The computer or microchip of claim 31, wherein said at least one microprocessor, core or processing unit is a general purpose microprocessor, core or processing unit.

33. The computer or microchip of claim 29, wherein said secure control bus is configured such that it cannot be affected, interfered with, altered or written to, or superseded by any part of said unprotected public unit or by input from said network of computers including the Internet.

34. The computer or microchip of claim 29, wherein said master controlling device controls through said secure control bus one or more secondary controllers that are located on said secure control bus.

35. The computer or microchip of claim 34, wherein said one or more secondary controllers are located in the unprotected public unit.

36. The computer or microchip of claim 35, wherein said one or more secondary controllers are used to control one or more of said at least one microprocessor, core or processing unit located in said unprotected public unit.

37. The computer or microchip of claim 36, wherein said one or more secondary controllers are integrated with one or more of said at least one microprocessor, core or processing unit located in said unprotected public unit.

38. The computer or microchip of claim 29, wherein said secure control bus is wired, wireless or a channel.

39. The computer or microchip of claim 29, wherein said secure control bus provides a connection to control a firewall located on a periphery of said computer or microchip.

40. The computer or microchip of claim 29, wherein said computer or microchip further comprises an unprotected public unit and said secure control bus connects at least said master controlling device with at least two of said microprocessors, cores or processing units located in said unprotected public unit.

41. The computer or microchip of claim 29, wherein said computer or microchip further comprises an unprotected public unit and said secure control bus connects at least said master controlling device with at least six of said microprocessors, cores or processing units located in said unprotected public unit.

42. A computer or microchip configured to be securely controlled through a private network, said computer or microchip comprising:
 at least one network connection for connection to a network of computers including the Internet;
 at least a separate private network connection for connection to at least said private network of computers, at least said separate private network connection being located in a hardware protected area of said computer or microchip,
 at least one microprocessor, core or processing unit configured to connect to said at least one connection for connection to said network of computers including the Internet;
 at least a master controlling device for the computer or microchip located in said hardware protected area; and
 a secure control bus that connects at least said master controlling device with at least said at least one microprocessor, core or processing unit, said secure control bus being isolated from input from said network of computers including the Internet and input from components of said computer or microchip other than said master controlling device; and
 said master controlling device being configured for securely controlling at least one operation executed by at least one said microprocessor, core or processing unit, said secure control being provided by said master controlling device through said private network to said separate private network connection in said hardware protected area and through said secure control bus.

43. The computer or microchip of claim 42, wherein said master controlling device comprises a non-volatile memory.

44. The computer or microchip of claim 42, wherein said computer or microchip further comprises an unprotected public unit and said secure control bus provides and ensures direct preemptive control by said master controlling device over said unprotected public unit.

45. The computer or microchip of claim 44, wherein said at least one microprocessor, core or processing unit is a general purpose microprocessor, core or processing unit.

46. The computer or microchip of claim 42, wherein said secure control bus is configured such that it cannot be affected, interfered with, altered or written to, or superseded by any part of said unprotected public unit or by input from said network of computers including the Internet.

47. The computer or microchip of claim 42, wherein said master controlling device controls through said secure control bus one or more secondary controllers that are located on said secure control bus.

48. The computer or microchip of claim 47, wherein said one or more secondary controllers are located in the unprotected public unit.

49. The computer or microchip of claim 48, wherein said computer or microchip further comprises an unprotected public unit and said one or more secondary controllers are used to control one or more of said at least one microprocessor, core or processing unit located in said unprotected public unit.

50. The computer or microchip of claim 49, wherein said one or more secondary controllers are integrated with one or more of said at least one microprocessor, core or processing unit located in said unprotected public unit.

51. The computer or microchip of claim 42, wherein said secure control bus is wired, wireless or a channel.

52. The computer or microchip of claim 42, wherein said secure control bus provides a connection to control a firewall located on a periphery of said computer or microchip.

53. The computer or microchip of claim 42, wherein said computer or microchip further comprises an unprotected public unit and said secure control connects at least said master controlling device with at least two of said microprocessors, cores or processing units located in said unprotected public unit.

54. The computer or microchip of claim 42, wherein said computer or microchip further comprises an unprotected public unit and said secure control bus connects at least said master controlling device with at least six of said microprocessors, cores or processing units located in said unprotected public unit.

* * * * *